(12) United States Patent
De Beer et al.

(10) Patent No.: US 11,828,535 B2
(45) Date of Patent: *Nov. 28, 2023

(54) FREEZING, DRYING AND/OR FREEZE-DRYING OF PRODUCT DOSE UNITS

(71) Applicant: UNIVERSITEIT GENT, Ghent (BE)

(72) Inventors: Thomas De Beer, Bachte (BE); Jozef Antonius Willem Maria Corver, Nuenen (NL); Brecht Vanbillemont, Munich (DE); Jean Paul Remon, Melle (BE)

(73) Assignee: UNIVERSITEIT GENT, Ghent (BE)

( * ) Notice: Subject to any disclaimer, the term of this patent is extended or adjusted under 35 U.S.C. 154(b) by 245 days.

This patent is subject to a terminal disclaimer.

(21) Appl. No.: 17/252,681

(22) PCT Filed: Jun. 28, 2019

(86) PCT No.: PCT/EP2019/067333
§ 371 (c)(1),
(2) Date: Dec. 15, 2020

(87) PCT Pub. No.: WO2020/002605
PCT Pub. Date: Jan. 2, 2020

(65) Prior Publication Data
US 2021/0190424 A1    Jun. 24, 2021

(30) Foreign Application Priority Data

Jun. 29, 2018 (EP) .................................. 18180796

(51) Int. Cl.
*F26B 5/06* (2006.01)
*F25B 21/02* (2006.01)
(Continued)

(52) U.S. Cl.
CPC ............... *F26B 5/06* (2013.01); *F25B 21/02* (2013.01); *F26B 5/044* (2013.01); *F26B 25/14* (2013.01); *F26B 25/18* (2013.01); *F26B 25/22* (2013.01)

(58) Field of Classification Search
CPC .. F26B 5/06; F26B 5/044; F26B 25/14; F26B 25/18; F26B 25/22; F25B 21/02; G01K 13/00
(Continued)

(56) References Cited

U.S. PATENT DOCUMENTS 3,513,559 A * 5/1970 Eilenberg .................. F26B 5/06
                                                          34/301
4,758,598 A * 7/1988 Gregory ............... A61K 9/0056
                                                         514/774
(Continued)

FOREIGN PATENT DOCUMENTS

CN    101126593 A    2/2008
CN    107850353 A    3/2018
(Continued)

OTHER PUBLICATIONS

International Search Report and Written Opinion from PCT Application No. PCT/EP2019/067333, dated Aug. 9, 2019.
(Continued)

*Primary Examiner* — John P McCormack
(74) *Attorney, Agent, or Firm* — WORKMAN NYDEGGER

(57) ABSTRACT

A device for holding and monitoring a predetermined dose of a product during a freezing, drying and/or lyophilization process, includes a mold having a receptacle part for containing the predetermined dose of the product in direct contact with the receptacle part, a sensor, contacting the mold or integrated in the mold, for measuring a physical
(Continued)

characteristic and/or quantity, and a transmitter for transmitting the measured characteristic and/or quantity in the form of a sensor signal to a control unit for controlling a heating and/or cooling element, integrated in the device, for heating and/or cooling a predetermined dose of product during a freezing, drying and/or lyophilization process, in the lyophilization process. The device relates in further aspects to a system and a method.

17 Claims, 13 Drawing Sheets

(51) Int. Cl.
   *F26B 5/04* (2006.01)
   *F26B 25/14* (2006.01)
   *F26B 25/18* (2006.01)
   *F26B 25/22* (2006.01)

(58) Field of Classification Search
   USPC .................................................. 34/296
   See application file for complete search history.

(56) References Cited

U.S. PATENT DOCUMENTS

| | | | |
|---|---|---|---|
| 4,915,897 A * | 4/1990 | Farrington | A61F 13/15642 425/81.1 |
| 5,964,043 A | 10/1999 | Oughton et al. | |
| 5,976,577 A * | 11/1999 | Green | A61P 29/00 424/455 |
| 6,006,996 A | 12/1999 | Bhatnagar | |
| 8,677,649 B2 | 3/2014 | Bottger et al. | |
| 8,793,895 B2 | 8/2014 | Gasteyer, III et al. | |
| 9,200,836 B2 | 12/2015 | Gasteyer, III et al. | |
| 9,642,386 B2 | 5/2017 | Boebst et al. | |
| 9,651,305 B2 | 5/2017 | Gasteyer et al. | |
| 10,368,566 B2 | 8/2019 | Boebst et al. | |
| 10,858,560 B2 | 12/2020 | Friedrich | |
| 2003/0116027 A1 | 6/2003 | Brulls | |
| 2007/0186437 A1 | 8/2007 | Gasteyer et al. | |
| 2009/0276179 A1* | 11/2009 | Barresi | G01K 1/024 702/182 |
| 2010/0242301 A1* | 9/2010 | Rampersad | F26B 5/06 34/92 |
| 2011/0016740 A1* | 1/2011 | Middelbeek | A61K 9/1694 34/284 |
| 2011/0099836 A1 | 5/2011 | Bottger et al. | |
| 2011/0107616 A1* | 5/2011 | Boebst | A23L 3/363 34/72 |
| 2014/0325868 A1 | 11/2014 | Gasteyer, III et al. | |
| 2015/0089830 A1* | 4/2015 | Wissner | B65B 7/2892 34/92 |
| 2015/0226617 A1 | 8/2015 | Thompson et al. | |
| 2016/0169579 A1 | 6/2016 | Gasteyer et al. | |
| 2016/0249671 A1 | 9/2016 | Boebst et al. | |
| 2018/0230349 A1 | 8/2018 | Friedrich | |
| 2019/0145705 A1* | 5/2019 | Delaveau | F26B 11/026 34/284 |
| 2019/0178576 A1* | 6/2019 | De Beer | F26B 5/06 |

FOREIGN PATENT DOCUMENTS

| | | |
|---|---|---|
| DE | 102016003859 A1 | 10/2017 |
| EP | 2195593 A1 | 6/2010 |
| GB | 2480299 A | 11/2011 |
| JP | S60191177 A | 9/1985 |
| JP | S6484088 A | 3/1989 |
| JP | H0642475 Y2 | 11/1994 |
| JP | H085157 Y2 | 2/1996 |
| JP | H08327229 A | 12/1996 |
| JP | H11502812 A | 3/1999 |
| JP | 2003018981 A | 1/2003 |
| JP | 3654685 B2 | 6/2005 |
| JP | 2008174505 A * | 7/2008 |
| JP | 2008174505 A | 7/2008 |
| JP | 2009526199 A | 7/2009 |
| JP | 2010537152 A | 12/2010 |
| JP | 2011524512 A | 9/2011 |
| JP | 2012525175 A | 10/2012 |
| JP | 2015055454 A | 3/2015 |
| JP | 2017053506 A | 3/2017 |
| JP | 2017224783 A | 12/2017 |
| TW | 432263 B | 5/2001 |
| WO | 2013036107 A2 | 3/2013 |
| WO | 2016123177 A1 | 8/2016 |
| WO | 2018033468 A1 | 2/2018 |

OTHER PUBLICATIONS

Extended European Search Report from corresponding Application No. EP18180796.7, dated Oct. 26, 2018.
De Meyer et al., "Modelling the Primary Drying Step for the Determination of the Optimal Dynamic Heating Pad Temperature in a Continuous Pharmaceutical Freeze-Drying Process for Unit Doses", International Journal of Pharmaceutics, Sep. 5, 2017, pp. 185-193.
Rambhatla et al., "Heat and Mass Transfer Scale-up Issues During Freeze Drying: II. Control and Characterization of the Degree of Supercooling", AAPS PharmSciTech, vol. 5, Issue 4, Aug. 5, 2004, 9 pages.
Sahni et al., "Modeling the Secondary Drying Stage of Freeze Drying: Development and Validation of an Excel-Based Model", Journal of Pharmaceutical Sciences, vol. 106, Nov. 30, 2016, pp. 779-791.
Van Bockstal et al., "Noncontact Infrared-Mediated Heat Transfer During Continuous Freeze-Drying of Unit Doses", Journal of Pharmaceutical Sciences, vol. 106, Jun. 16, 2016, pp. 71-82.
Search Report from Taiwanese Application No. 108122912, dated Jan. 17, 2023.
Office Action from Taiwanese Application No. 108122912, dated Jan. 17, 2023.
Japanese Office Action from corresponding JP Application No. 2020-571810, dated May 23, 2023.

* cited by examiner

FREEZING, DRYING AND/OR FREEZE-DRYING OF PRODUCT DOSE UNITS

FIELD OF THE INVENTION

The invention relates to the field of freeze-drying of products in unit doses, e.g. to form tablets, such as orally disintegrating tablets. More specifically it relates to a device comprising a mold for holding, monitoring and controlling a predetermined dose of a product during a lyophilization process, a system for freeze-drying a dose unit of a product and a method for freeze-drying a product.

BACKGROUND OF THE INVENTION

The present invention relates to the production of tablets by freeze-drying, e.g. such as known to manufacture orally disintegrating tablets. For example, by freeze-drying, a porous micro-structure can be formed due to the sublimation of ice crystals. Such porous micro-structure has the advantage of rapidly disintegrating in the mouth. Particularly, it is known in the art to dose an aqueous drug suspension or solution into blisters, followed by rapidly freezing the aqueous liquid and then freeze-drying to remove the ice to leave a porous tablet that can disperse in a few seconds in the mouth.

For example, a medicinal substance may be dissolved or dispersed in an aqueous solution, e.g. in a carrier material and edible materials such as gelatin and mannitol. It is known in the art to, dose the mixture, e.g. by volume or weight, into the pockets of a preformed blister pack. The water in the suspension may be frozen within the blister pockets by passing the blister trays through a freezing tunnel. The freezing temperature and duration of transit through the tunnel may determine the structural characteristics of the frozen product, e.g. which affect the quality of the finished product, such as the quality with regard to strength, stability and rapid disintegration time. The frozen units may be loaded onto the shelves of a large freeze-dryer for removing a large volume of vapor without substantial melt-back. To achieve an economic production on a commercial scale, such dryer may typically have a shelf area in the range of 60 m² to 174 m². For example, U.S. Pat. No. 5,976,577 discloses a related method in which a fluid suspension of an active substance is dosed into discrete units using a mold. The product may then be freeze-dried to obtain an oral solid rapidly disintegrating dosage unit.

In a related field, WO 2013/036107 discloses a method for continuous freeze-drying parenteral compositions in ready-to-use vials, e.g. such as to coat the composition on the vial in dried form. The vials are rotated during the freezing process to stretch the composition over the inner circumferential wall of the vial. Formation of the ice crystals may be monitored using an optical sensor. The vials are transported by a conveyor or conveyors through multiple chambers to perform the successive steps of the process. The cooling module and the sublimation module may be separated by a load-lock.

WO 2016/123177 relates to freeze drying process of pharmaceutical products in product vials integrating sensors. Selected vials in a plurality thereof include sensors which measure parameters related to lyophilization, in a lyophilization chamber. The sensors communicate the results of the measurement to a process controller. Based on spatial analysis of readings from the selected vials, adjustment of process conditions, such as heating of shelves in the chamber, is provided.

GB2480299 relates to control of lyophilization on industrial scale, in a similar way. However, a sensor is provided for specifically measuring mobility of ions in the solution being lyophilized. The recipients include electrode setups for providing such measurement.

US2009/0276179 relates to a system for monitoring lyophilization process of products in bottles or vials in a lyophilization chamber. The temperature of each container is measured, and the measurements are wirelessly transmitted to the exterior of the chamber, so the heat transfer between the products and the heating plate can be taken into account in the calculation of the sublimation interface.

EP2195593 relates to a device for controlling temperature of products to be frozen (freeze dried) by using Peltier elements associated with a plurality of receptacle areas of a magazine. The receptacle areas may receive syringes.

SUMMARY OF THE INVENTION

It is an object of embodiments of the present invention to provide good and efficient means and methods for the controlled freeze-drying of a predetermined dose unit of a product.

The above objective is accomplished by a method and device according to the present invention.

It is an advantage of embodiments of the present invention that individual doses, corresponding to individual freeze-dried tablets being manufactured, can be monitored and/or controlled separately during the process.

It is an advantage of embodiments of the present invention that process parameters for individual doses, corresponding to individual freeze-dried tablets being manufactured, can be adjusted separately during the process in response to sensor measurements obtained for that dose specifically.

It is an advantage of embodiments of the present invention that variability of properties of the manufactured product can be low, e.g. that variability between individual doses can be advantageously low.

For example, it is an advantage that annealing times and heat transport can be controlled in detail for each individual dose.

It is an advantage of embodiments of the present invention that a freeze-drying process can be performed in a one-piece-flow methodology, e.g. such that an inter-batch and/or intra-batch variability inherent to a batch-wise process can be avoided.

It is an advantage of a one-piece-flow system in accordance with embodiments of the present invention that an efficient production in terms of time and space requirements and flexibility in terms of throughput are provided.

It is an advantage of embodiments of the present invention that a freeze-dried product in the form of tablets can be manufactured by a fast and/or efficient process, e.g. even while providing a high level of reproducibility and conformance.

It is an advantage of embodiments of the present invention that quality control of all individual doses of a product can be performed inline, e.g. can be performed easily and/or economically.

In a first aspect, the present invention relates to a device for holding and monitoring a predetermined dose, i.e. a predetermined unit dose, of a product during a drying, freezing and/or lyophilization process. The device comprises a mold having a receptacle part for containing the predetermined dose of the product in direct contact with the receptacle part, e.g. for forming and/or shaping the predetermined dose. The mold may be adapted for easy removal of the finished product. The device comprises at least one sensor, contacting the mold or integrated in the mold, for measuring a physical characteristic of the predetermined dose and/or a physical quantity affecting the predetermined dose during the process, such as a temperature in and/or a heat flux through the mold. The device comprises a transmitter for transmitting the measured physical characteristic and/or physical quantity, e.g. the temperature and/or the heat flux, in the form of a sensor signal to a control unit for controlling a heating and/or cooling element in the process. Further, the device comprises a heater and/or cooler unit including a heating and/or cooling element functionally attached to the device (e.g. integrated in the device), in communication with the control unit for controlling said element for controlling heat transport to the individual predetermined dose. The heater and/or cooler unit may be integrated for example in the mold.

In a device in accordance with embodiments of the present invention, the at least one sensor may be adapted for measuring a morphological characteristic(s) of the predetermined dose, such as a crystal structure, and/or for measuring a relative humidity of the substance. The at least one sensor may comprise a near-infrared sensor, a fiber-optic Bragg grating and/or a Raman sensor, as known in the art.

A device in accordance with embodiments of the present invention may be adapted for forming the predetermined dose in the form of a solid unit dose from a solution or a suspension in liquid when the lyophilization process is applied to the solution or suspension while contained in the mold. For example, the mold may be adapted for shaping the solution or suspension. The mold may comprise, or consist of, a plurality of subparts. For example, the mold may comprise an insert element, e.g. an insert, for shaping the unit dose, and/or for facilitating the removal of the unit dose from the mold after performing the lyophilization process and/or to influence the direction or quantity of heat flux.

In a device in accordance with embodiments of the present invention, the predetermined dose of the product may be a predetermined dosage of a medicinal substance, a food product and/or a substance for cosmetic usage, e.g. the receptacle part may be adapted for containing such predetermined dose of such product.

In a device in accordance with embodiments of the present invention, said predetermined dose of the product may form a tablet or pill with a predetermined shape. For example, it may be an orally disintegrating tablet, a mucoadhesive tablet or a multilayer tablet when the lyophilization process has been carried out.

In a device in accordance with embodiments of the present invention, the mold may be composed of a metal, a metal alloy, a carbon material and/or a plastic material, e.g. a polymer, for example polytetrafluoroethylene (PTFE).

In a device in accordance with embodiments of the present invention, the mold may be adapted for providing easy removal of the individual predetermined dose.

In a device in accordance with embodiments of the present invention, the heater and/or cooler unit may comprise the heating element and/or the cooling element that is/are controllable by the control unit.

In a device in accordance with embodiments of the present invention, the control unit is functionally attached to the device, e.g. is an integral part of the mold.

In a device in accordance with embodiments of the present invention, the heater and/or cooler unit may comprise a Peltier element adapted for freezing and/or heating the predetermined dose in the receptacle part.

In a device in accordance with embodiments of the present invention, the heater and/or cooler unit may comprise an absorber for absorbing heat radiation.

A device in accordance with embodiments of the present invention may comprise an ultrasonic vibration generator in contact with the mold or integrated in the mold, in which the ultrasonic vibration generator is adapted for controlling nucleation of the product by ultrasonification while freezing the predetermined dose when contained in the receptacle part.

A device in accordance with embodiments of the present invention, may comprise an insert element for inserting into the predetermined dose when contained in the receptacle part, in which the insert element may comprise at least one elongate structure.

In a device in accordance with embodiments of the present invention, the at least one elongate structure may be a plurality of elongate structures, the elongate structures being arranged substantially parallel with respect to each other.

In a device in accordance with embodiments of the present invention, the or each of the at least one elongate structure may have a cross-section diameter in the range of 100 μm to 2000 μm, e.g. in the range of 200 μm to 1000 μm.

Embodiments of the present invention may also relate to a kit of parts comprising at least one device in accordance with embodiments of the present invention and the at least one insert element for inserting into the predetermined dose when contained in the receptacle part of the at least one device.

In a device in accordance with embodiments of the present invention, the transmitter may comprise a bristle brush and/or a conductive pad for establishing a connection with an external receiver.

In a device in accordance with embodiments of the present invention, the transmitter may comprise a communication module for transmitting data wirelessly to an external receiver.

A device in accordance with embodiments of the present invention may comprise a battery for powering the sensor and/or the heater and/or cooler unit.

A device in accordance with embodiments of the present invention may comprise a mechanical engagement element adapted for holding and transporting the device by a conveyance mechanism.

In a device in accordance with embodiments of the present invention, said mold may comprise a plurality of receptacle parts for containing a corresponding plurality of predetermined doses of the product, and a plurality of sensors for measuring the temperature in and/or heat flux through the mold in locations corresponding to the plurality of receptacle parts.

In a second aspect, the present invention relates to a system for freezing, drying and/or freeze-drying at least one predetermined dose of a product. The system comprises at least one device in accordance with embodiments of the first aspect of the present invention, a cooling element for freezing the at least one predetermined dose of the product when contained in the at least one receptacle part of the mold of the at least one device and/or a heating element for heating the at least one predetermined dose of the product when contained in the at least one receptacle part of the mold of the at least one device, a vacuum chamber for exposing the at least one predetermined dose to a low pressure environment while heating the at least one predetermined dose using the heating device to desiccate the at least one predetermined dose. In embodiments where the device does not include a control unit, the system includes a control unit for receiving at least one sensor signal from the transmitter of the device and for controlling the heating element and/or the cooling element, in which the controlling takes the at least sensor signal into account.

A system in accordance with embodiments of the present invention may comprise a vacuum lock for inserting the at least one predetermined dose into and/or removing the at least one predetermined dose from the vacuum chamber.

In a system in accordance with embodiments of the present invention, the cooling element may be integrated in the vacuum lock, e.g. the vacuum lock may also act as a freezer.

In a system in accordance with embodiments of the present invention, the cooling element, e.g. a Peltier element, may be comprised in (or a part thereof may be comprised in) the heater and/or cooler unit for heating and/or cooling the at least one predetermined dose in the receptacle part of the at least one device.

A system in accordance with embodiments of the present invention may comprise a loading system.

In a system in accordance with embodiments of the present invention, the loading system may be adapted for loading and unloading the at least one predetermined dose into and out of the vacuum chamber, e.g. via the vacuum lock.

In a system in accordance with embodiments of the present invention, the loading system may be adapted for inserting and/or removing the predetermined dose into and/or from the vacuum chamber while the predetermined dose is contained in the device and/or separately (separate from the device) in a frozen state. For example, the predetermined doses may be loaded in a frozen state, e.g. separate from the mold, or may be loaded together with the mold, e.g. while in the mold.

A system in accordance with embodiments of the present invention may comprise a tunnel freezer, e.g. comprising the cooling element, and the system may be adapted for transporting the at least one device containing the at least one predetermined dose in a liquid state through the tunnel freezer such as to freeze the at least one predetermined dose. For example, the loading system may be adapted for transporting the at least one device containing the at least one predetermined dose in a liquid state through the tunnel freezer such as to freeze the at least one predetermined dose.

A system in accordance with embodiments of the present invention may comprise a freezer cabinet or freezer room, e.g. comprising the cooling element, in which the at least one device in accordance with embodiments of the first aspect of the present invention can be loaded for freezing the at least one predetermined dose. For example, the loading system may be adapted for loading and/or unloading the at least one device in accordance with embodiments of the first aspect of the present invention into and/or out of the freezer cabinet or freezer room.

A system in accordance with embodiments of the present invention may also comprise a blistering system for packaging the at least one predetermined dose, e.g. after being freeze-dried.

In a system in accordance with embodiments of the present invention, the vacuum chamber may be a cylindrical chamber. The vacuum lock may form a segment of the cylindrical chamber or the vacuum lock may be connected to a segment of the cylindrical chamber, e.g. via a cylindrical hull wall of the chamber.

A system in accordance with embodiments of the present invention may comprise a stationary surface or a rotatable surface, in which the vacuum chamber is adapted for rotating over the stationary surface or in which the rotatable surface is adapted for rotating in or underneath the vacuum chamber.

In a system in accordance with embodiments of the present invention, the loading system may be adapted for loading the at least one device in the vacuum chamber by placing the at least one device on the stationary surface or on the rotatable surface via the vacuum lock.

In a system in accordance with embodiments of the present invention, the loading system may comprise a conveyance mechanism for transporting a plurality of devices in accordance with embodiments of the first aspect of the present invention, in which the conveyance mechanism forms a loop such as to transport the plurality of devices along a closed loop trajectory. For example, the conveyance mechanism may be an endless conveyor belt. The plurality of devices may be fixed on or integrated in the endless conveyor belt. For example, an endless mold may be formed by the plurality of devices.

In a third aspect, the present invention relates to a method for freeze-drying a product in a predetermined dose unit. The method comprises providing the predetermined dose contained in a receptacle part of a mold adapted for shaping the predetermined dose of the product, freezing the predetermined dose of the product contained in the receptacle part of the mold, heating the frozen predetermined dose of the product in the receptacle part of the mold while exposing the predetermined dose to a low pressure environment to desiccate the predetermined dose, measuring a physical characteristic of the predetermined dose unit and/or a physical quantity affecting the predetermined dose unit, e.g. a temperature in and/or a heat flux through the mold, during the step of freezing and/or during the step of heating using a sensor that contacts the mold or that is integrated in the mold, and controlling at least one parameter of the freezing and/or the heating, in which this controlling takes the measured temperature and/or heat flux into account. Freezing and/or heating the predetermined dose of the product in the receptacle part of the mold comprises using a heater and/or cooler unit being integrated in a device comprising the mold. The heater and/or cooler unit is in communication with the control unit, for controlling heat transport to the individual predetermined dose.

The physical quantity and/or physical characteristic may comprise a temperature, a heat flux, a morphological characteristic(s) and/or a humidity level of the predetermined dose.

In a method in accordance with embodiments of the present invention, the step of freezing and/or the step of heating may comprise freezing, respectively heating, the predetermined dose using a heater and/or cooler unit that is integrated in the mold or that is in direct contact with the mold.

In a method in accordance with embodiments of the present invention, providing the predetermined dose may comprise providing a device, comprising the mold, in accordance with embodiments of the first aspect of the present invention.

In a method in accordance with embodiments of the present invention, providing the predetermined dose may comprise filling the receptacle part of the mold with a predetermined quantity of a liquid solution or suspension of the product.

A method in accordance with embodiments of the present invention may comprise transmitting the measured temperature and/or heat flux (and/or a relative humidity and/or a morphological characteristic such as a crystal morphology) in the form of a sensor signal to a control unit for controlling a heating and/or cooling element, e.g. a heating and/or cooling element used in the steps of heating and/or freezing.

In a further aspect, the present invention relates to a product obtained or obtainable by a method in accordance with embodiments of the third aspect of the present invention. The product may be an orally disintegrating tablet, a muco-adhesive tablet or a multilayer tablet. The product may comprise, or consist of, a particular dosage of a medicinal or chemical substance, a food product, microorganisms (e.g. probiotics) and/or a substance for cosmetic or agricultural usage.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
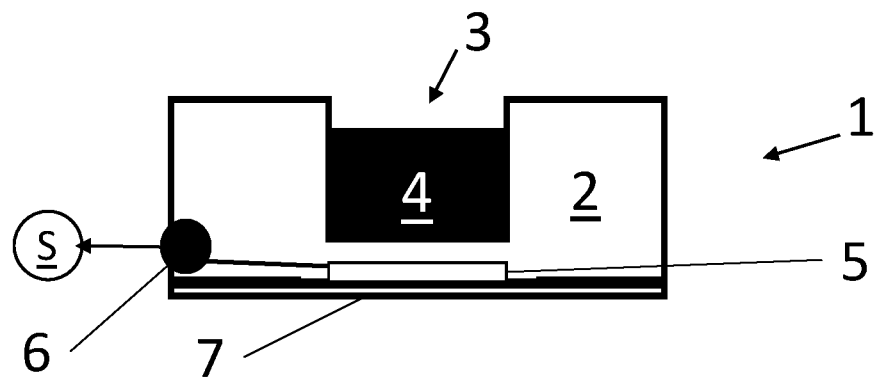
FIG. 1 shows a device for holding and monitoring a predetermined dose of a product during a freezing and/or lyophilization process in accordance with embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a device for holding and monitoring a predetermined dose of a product during a freezing, drying and/or lyophilization process. The device comprises a mold having a receptacle part for containing the predetermined dose of the product in direct contact with the receptacle part. The device comprises at least one sensor, contacting the mold or integrated in the mold, for measuring a physical characteristic of the predetermined dose and/or a physical quantity affecting the predetermined dose during the process, such as a temperature in and/or heat flux through the mold. The device comprises a transmitter for transmitting the measured physical quantity and/or physical characteristic, e.g. the temperature and/or heat flux, to a control unit for controlling a heating and/or cooling element in the process. The physical quantity and/or physical characteristic may comprise a temperature, a heat flux, a relative humidity and/or a morphological property of the dose during the process.

Referring to FIG. 1, a part of a device 1, for holding and monitoring a predetermined dose 4 of a product during a freezing, drying and/or lyophilization process, in accordance with embodiments of the present invention is shown (the heater and/or cooler unit not being shown in FIG. 1). For example, the device may be adapted for forming a solid unit dose, e.g. a tablet such as an orally disintegrating tablet, from a substance, a solution or a suspension in liquid, e.g. by applying the freezing, drying and/or lyophilization process to the solution or suspension while contained in the device 1.

The device 1 comprises a mold 2 having a receptacle part 3 for containing the predetermined dose 4, e.g. a predetermined dose unit, of the product in direct contact with the receptacle part. The mold 2 may be adapted for shaping the predetermined dose 4. The mold 2 may be adapted for allowing a good heat transfer from and to the predetermined dose 4 through the mold material. For example, the mold 2 may be composed of a metal or an alloy, such as aluminium, e.g. anodized aluminium, steel, e.g. stainless steel, or a carbon material, for example graphite, or a plastic material, e.g. a polymer, or other, e.g. ceramics. In preferred embodiments, the mold is not a glass mold, because there are an ample range of other less fragile materials which are better heat conductors and easier to fabricate and shape. The mold 2 may comprise a coating, e.g. for improving the durability of the bulk material of the mold, for allowing a good release of the predetermined dose 4 from the mold 2 and/or for improving antiseptic (or aseptic) and/or heat transfer properties and/or heat transport.

The predetermined dose 4 of the product may be a particular dosage of a medicinal, biological and/or chemical substance, a food product, microorganisms (e.g. probiotics) and/or a substance for cosmetic or agricultural usage.

The predetermined dose 4 may be a porous solid mass of the medicinal, biological and/or chemical substance, at least partly shaped by the shape of the receptacle part during the process. The mold is preferably a mold for tablets or pill-sized doses of product, for molding and giving a definite shape to the tablet or pill, rather than a bottle or vial. Preferably the opening of the mold is at least as wide as the tablet or pill, easing its removal. In particular, a mold is preferably not a vial or bottle, as far as such receptacles do not allow easy removal of the product (e.g. vials require breaking for retrieving the product within).

The predetermined dose 4 may be a tablet, or may form a tablet when the lyophilization process has been carried out. For example, after lyophilization, the predetermined dose may be a solid, e.g. in the form of a porous microstructure. The tablet may be an orally disintegrating tablet (ODT). For example, the tablet may be adapted for dissolving rapidly when placed upon the tongue.

Figure 18:
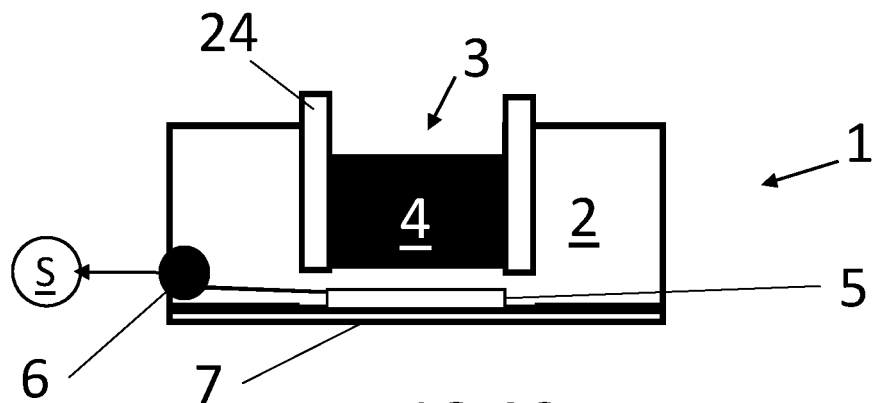
FIG. 18 and FIG. 19 show two devices including alternative shapes of an insert element for providing easy removal of the predetermined dose, in accordance with embodiments of the present invention.
Figure 19:
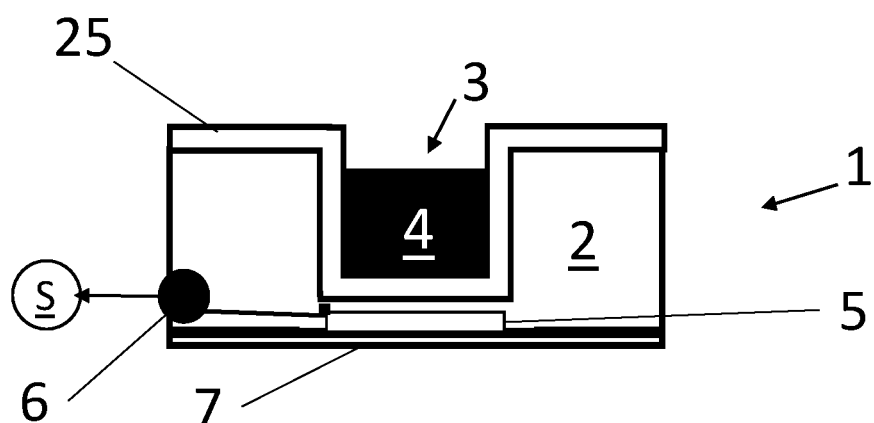

A device in accordance with embodiments of the present invention may also comprise an insert element 32 for inserting into the predetermined dose 4 when in the receptacle part 3, e.g. before freezing the predetermined dose, for example when the predetermined dose 4 is (substantially) in liquid form. The insert element may be separate from the device 1. In other words, embodiments of the present invention may relate to a kit of parts comprising at least one device 1 in accordance with embodiments of the present invention and at least one insert element for inserting into the predetermined dose 4 when in the receptacle part 3. The insert element may also be comprised in the device in accordance with embodiments of the present invention, e.g. may be comprised in the mold. The insert element may be a removable part of the mold. For example, the insert element may be part of the walls of the mold, and may allow good heat transfer. It may be part of the lateral walls of the receptacle part 3, and/or part of its bottom. For example, the insert element may comprise the lateral walls of the receptacle part 3, for example a ring, e.g. a plastic ring 24 as shown in FIG. 18 which can be removed from the rest of the mold 2, or for example two pieces which can be linked to form a ring and which can be separated for easy dislodging of the predetermined dose 4. For example, the insert element may comprise the lateral and bottom walls of the receptacle part, e.g. the insert element may be a blister 25 as shown in FIG. 19, e.g. a plastics blister. For example, a plurality of inserts can be provided as removable parts of the mold, e.g. an insert element on the lateral walls (such as a ring or blister) and a top insert element, e.g. a cover of the receptacle part, or an insert element comprised on the lateral and bottom walls of the receptacle part (e.g. a blister) plus a top insert element.

Figure 9:
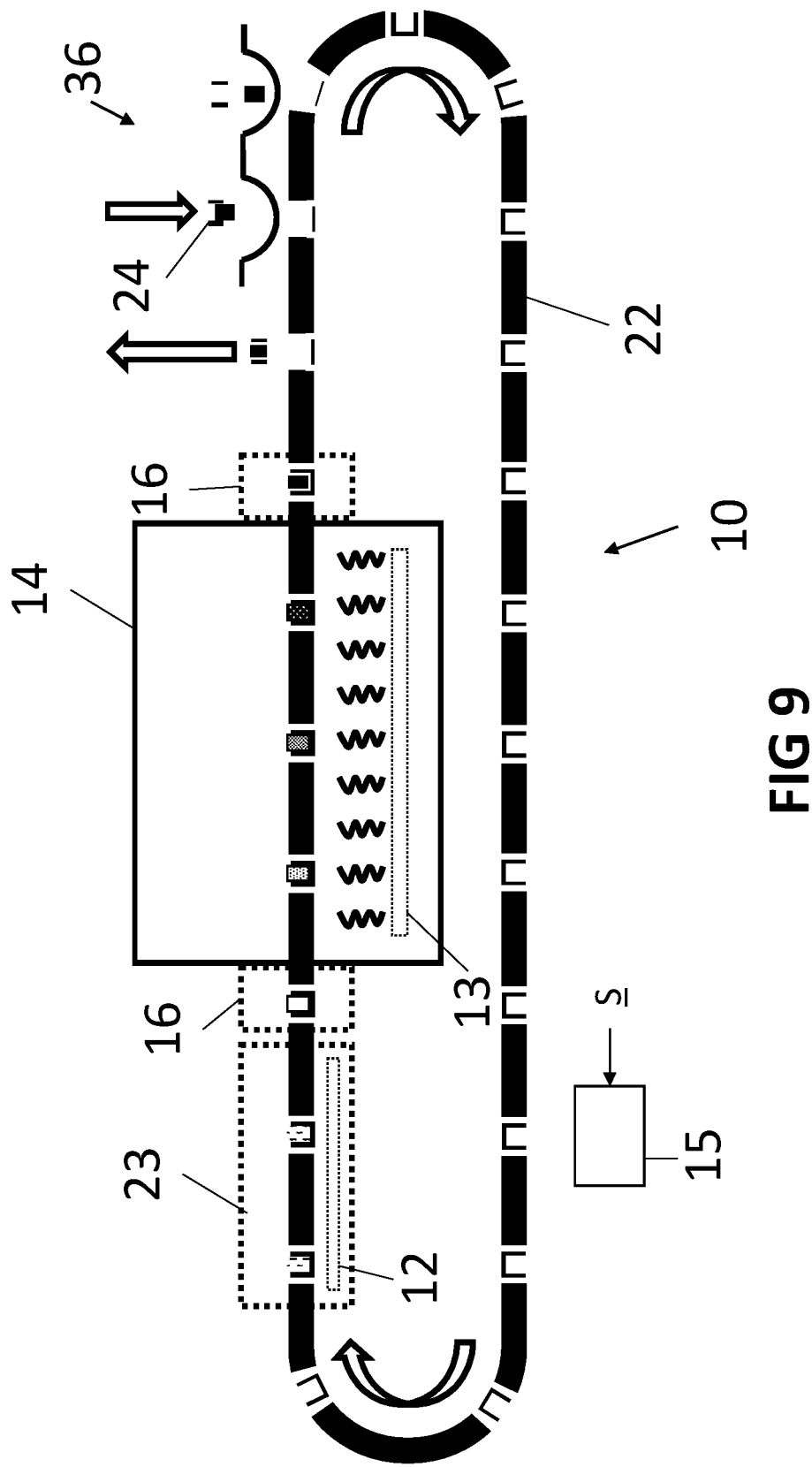
FIG. 9 shows another system in accordance with embodiments of the present invention, comprising a conveyance mechanism.

The insert element may be adapted for increasing a sublimation surface. The insert element may advantageously facilitate a homogeneous heat transfer, e.g. improve heat transfer along a vertical direction through the predetermined dose in the receptacle part. The insert element may also facilitate the release of the dose from the receptacle part after drying of the frozen predetermined dose 4. For example, the insert element forming part of the walls of the receptacle part may be easily releasable from the mold, thus allowing easy release of the dose. For example, the ring 24 or blister 25 can be easily removed from the mold, allowing easy removal of the dose therefrom. An example of removal with a ring is shown in FIG. 9, where a force is applied on the dose to push the dose onto a tray, for example by a pushing device, by shaking or vibrating the ring, or by opening the ring so the dose falls by gravity; or in case of a blister, by turning and shaking the blister, for example.

Also, a top insert element may be adapted to allow easy removal of the mold.

Figure 11:
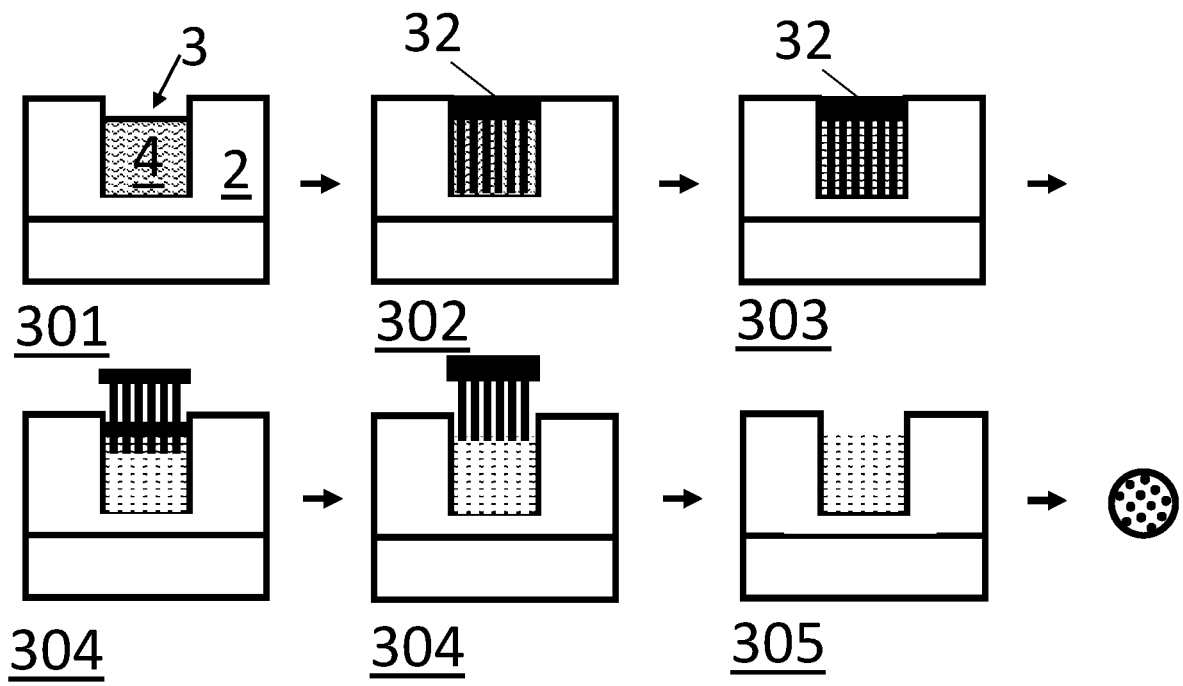
FIG. 11 shows an application of an insert element in a device in accordance with embodiments of the present invention.

FIG. 11 illustrates an exemplary use of such insert element 32. In a first step, the receptacle part 3 of the mold 2 may be filled 301 with the predetermined dose 4 of the product. Then, the insert element 32 may be inserted 302 in the predetermined dose 4. After freezing 303 the predetermined dose, the insert element 32 may be extracted 304. Thus, a surface area over which sublimation of the frozen product, e.g. sublimation of ice, can occur during freeze-drying 305 can be advantageously increased.

Figure 12:
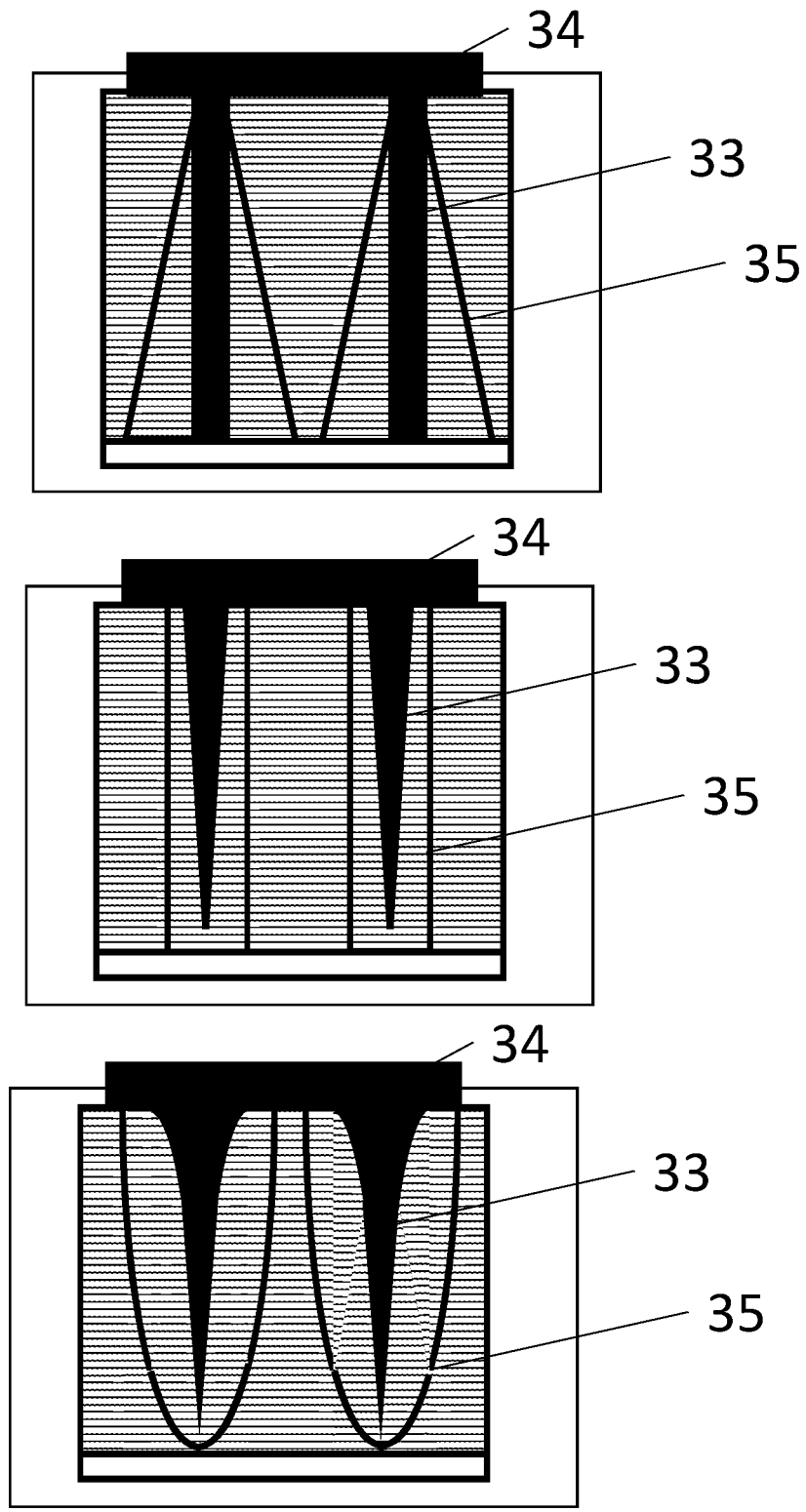
FIG. 12 illustrates different shapes of the insert element in a device in accordance with embodiments of the present invention.

FIG. 12 illustrates different shapes of the insert element 32. The insert element 32 may comprise at least one elongate structure 33. The elongate structure(s) may be fixed to a base 34, e.g. for holding the elongate elements and/or spacing the elongate structures apart. The at least one elongate structure may consist of a number of elongate structures in the range of 1 to 50, e.g. in the range of 3 to 25, e.g. in the range of 5 to 20, e.g. in the range of 6 to 15.

The elongate structures may be arranged substantially parallel with respect to each other. The elongate structure(s) may have a constant cross sectional area or may have a cross sectional area that decreases in a direction away from the base. The elongate structure(s) may, for example, be cylindrical, conical or parabolic in shape. The diameter of the elongate structure(s) may, for example, lie in the range of 100 µm to 2000 µm, e.g. in the range of 200 µm to 1000 µm.

The elongate structure(s) may comprise or consist of Teflon, aluminium, anodised aluminium, stainless steel, and e.g. coated stainless steel, titanium and/or a polyether ether ketone (PEEK) material. Other suitable materials may be characterized by their similar properties, e.g. allowing a good release when retracted from the frozen product, a good tensile strength and/or a good temperature stability. Furthermore, a suitable material may also be sufficiently inert, e.g. may not interact with the product on contact or, at least, may not adversely affect the composition and/or purity of the product.

Different shapes of the elongate structures may affect the shape of the sublimation surface 35 differently. The mass transfer and heat transfer processes during the sublimation process, e.g. during the freeze-drying, may be taken into account for determining an appropriate shape for the elongate structures. For example, the (local) cross section circumference of the elongate structure, and hence of a hole formed after removal of the insert element from the frozen product, may affect the mass transfer during sublimation. On the other hand, the manner in which heat is transferred to, and propagates in, the product during the freeze-drying may also affect the sublimation process. In the examples shown in FIG. 12, a heat transfer from the bottom to the top is assumed to obtain the illustrative sublimation fronts 35.

Thus, the top insert may not only provide an increased sublimation surface, but may also provide easy release of the dose. In the case of FIG. 11 and FIG. 12, these advantages are provided by the elongate structures 33 of the insert 32.

The device comprises one or more sensors 5, contacting the mold or integrated in the mold, for measuring a physical characteristic(s) and/or a physical quantity, e.g. a temperature in and/or heat flux through the mold. The sensor may measure a temperature indicative of the temperature of the predetermined dose 4 of the product. Preferably, the sensor may measure the temperature in a point close to the predetermined dose 4 of the product. The sensor may measure the heat flow through a region of the mold near the predetermined dose 4 of the product.

The sensor 5 may be integrated in the mold such as to avoid direct contact with the product, e.g. to avoid a risk of contamination and to enable the mold to be cleaned and/or sterilized without damaging the sensor. For example, the sensor may be fully encapsulated in the mold. However, the sensor may also be attached to the mold, e.g. glued on, soldered on or otherwise adhering to the mold.

The sensor may comprise a power monitoring circuit, e.g. for measuring a voltage and/or a current, for measuring a power (e.g. voltage and/or current) consumed by the heating and/or cooling element (e.g. in embodiments where the heating and/or cooling element are at least partly integrated in or on the device, e.g. measuring a current running through a Peltier element in or on the mold). For example, this measured power, current or voltage may be indicative of a heat flux through the mold and/or the predetermined dose in the receptacle part.

The sensor may comprise a resistance thermometer, e.g. a platinum resistance thermometer such as a Pt100 or a Pt1000 thermometer sensor. The sensor may comprise a resistance thermometer in which the resistance is measured over the mold material itself. For example, the sensor 5 may comprise a carbon thermometer or a compound carbon thermometer in which at least a part of the resistance measurement path is formed through a carbon material of the mold.

Alternatively or additionally, the at least one sensor may comprise a near-infrared (NIR) spectrometer, a Raman sensor and/or a fiber-optic Bragg grating.

Figure 4:
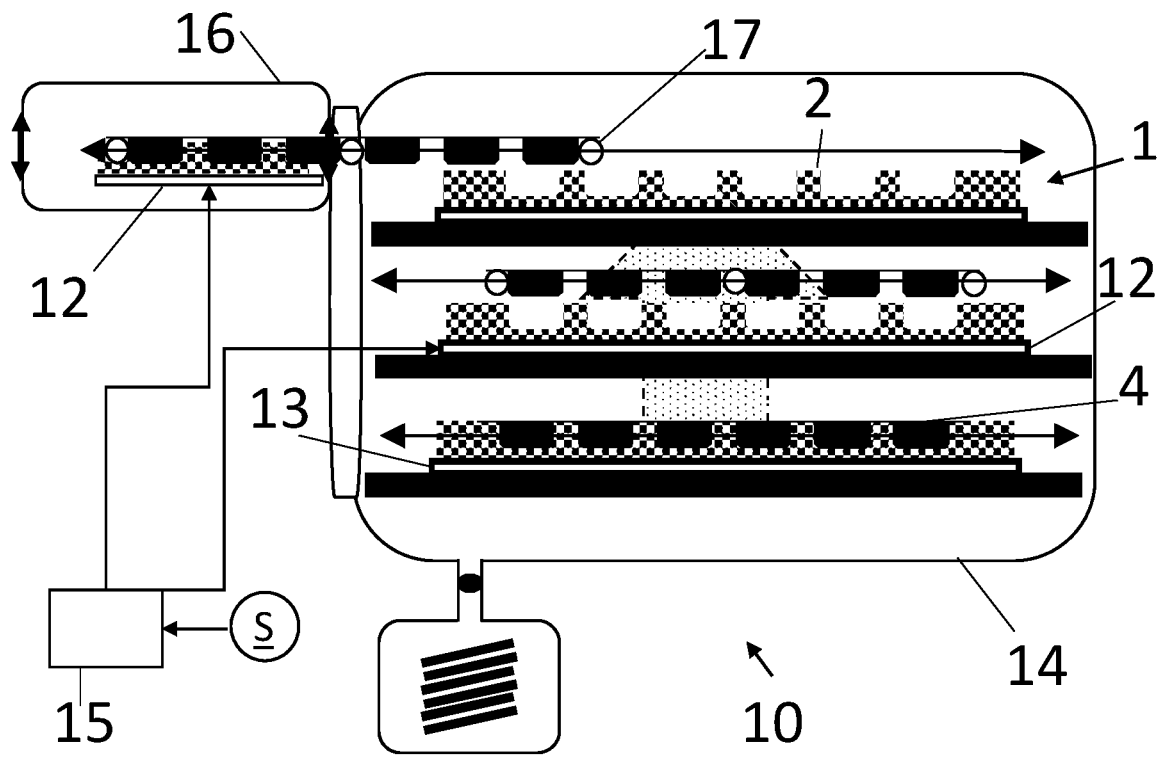
FIG. 4 shows a system in accordance with embodiments of the present invention.

The device 1 comprises a transmitter 6 for transmitting the measured quantity and/or characteristic, e.g. the temperature and/or heat flux and/or humidity and/or morphological characteristic, in the form of at least one sensor signal S to a control unit 15 for controlling a heating element 13 and/or cooling element 12 (e.g. as illustrated in FIG. 4 and/or FIG. 9) in one or more steps of the process.

Figure 20:
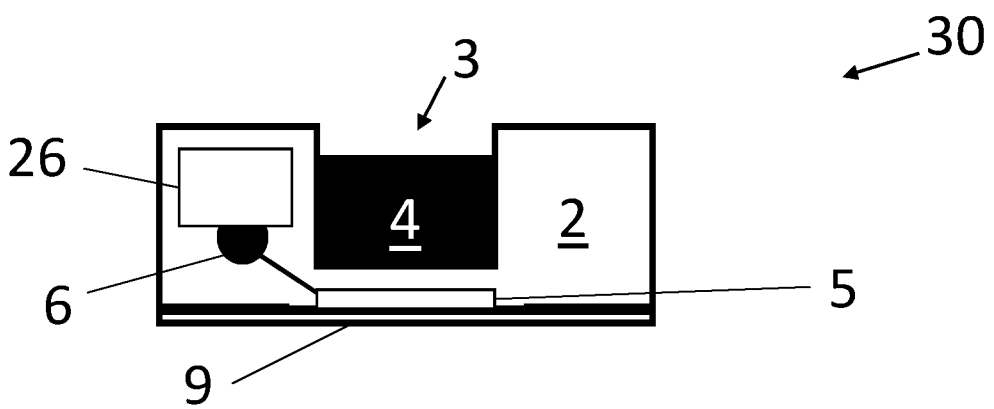
FIG. 20 shows a device, comprising a heater and/or cooler unit and an integrated control unit, in accordance with embodiments of the present invention.

In some embodiments of the present invention, as shown in FIG. 20, a modular device 30 can be obtained, by including a control unit 26 in the device 30, as part of the mold 2. The transmitter 6 would then comprise connectors, such as wiring, vias or conductive tracks for example, between the integrated sensor 5 and integrated control unit 26, both being parts of the mold 2. However, the present invention is not limited thereto, and the control unit may be an external unit, not part of the device, where the transmitter can be connected to the control unit.

For example, the transmitter 6 may be an active device, e.g. may comprise active electronic components, but may also be a passive device, such as a signal lead that can be accessed externally. The transmitter may comprise a conductive pad, e.g. a metallic pad, for establishing a connection with an external receiver, e.g. via a bristle brush connection, or vice versa, the transmitter may comprise a bristle brush for establishing a connection with an external receiver. The transmitter may establish electrical contact between the sensor 5 and an external connector, e.g. via a wire connector.

The transmitter 6 may comprise a communication module, e.g. for transmitting data, e.g. the sensor measurements, wirelessly. For example, the transmitter may comprise a near-field communication (NFC) module, a Bluetooth communication module and/or a WiFi communication module.

The device 1 may comprise a mechanical engagement element 7 for holding and transporting the device by a conveyance mechanism during the freezing, drying and/or lyophilization process, e.g. transporting into and/or through a vacuum chamber.

For example, such mechanical engagement element 7 may comprise a support surface, such as a bottom surface of the mold 2, e.g. which can be placed on a conveyor belt to be transported, e.g. in and/or through the vacuum chamber or a load-lock.

Figure 3:
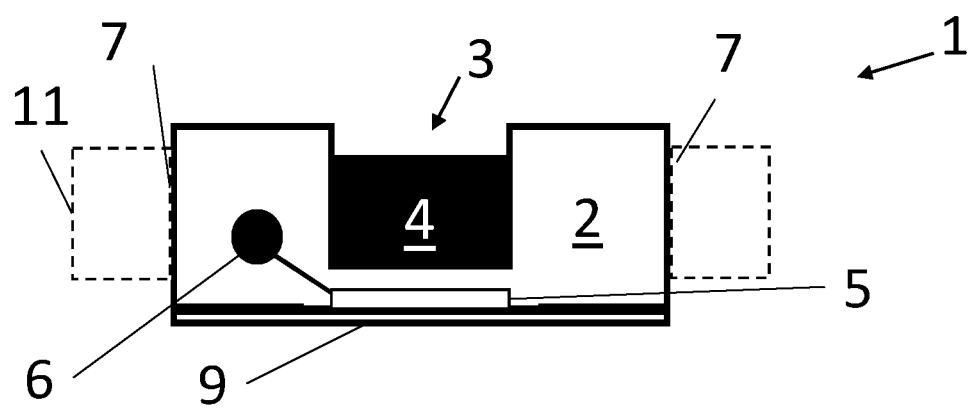
FIG. 3 shows another device in accordance with embodiments of the present invention.

The mechanical engagement element 7 may also comprise at least one side surface, e.g. as shown in FIG. 3, for example such that the device 1 may be contacted at such side surface by a conveyor belt segment 11, and/or such that a plurality of devices 1 may abut on each other by their respective side surfaces.

However, the mechanical engagement element 7 may also comprise elements, such as a hook, a ring, a loop, groove and/or tongue, or similar mechanical engagement means, for holding onto or gripping into a corresponding part of such conveyance mechanism and/or of corresponding parts on another device 1 in accordance with embodiments of the present invention, e.g. such as to create an interlocked series of devices 1.

Figure 2:
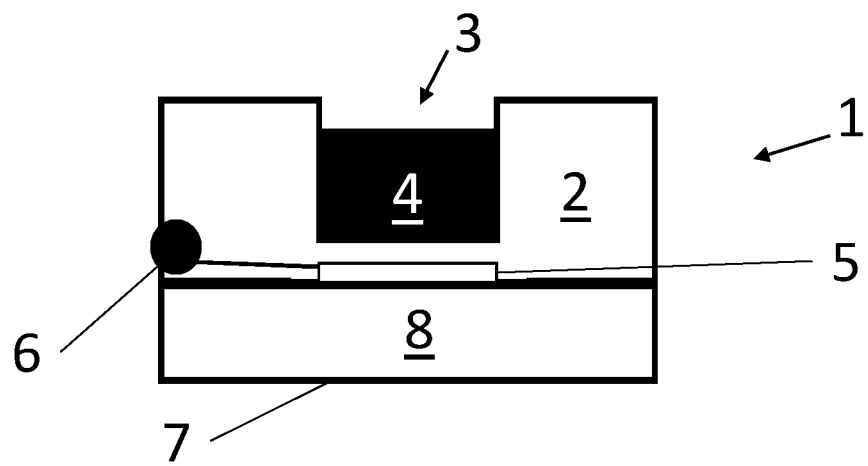
FIG. 2 shows a device, comprising a heater and/or cooler unit, in accordance with embodiments of the present invention.

Referring to FIG. 2, the device 1 comprises a heater and/or cooler unit 8 for heating and/or cooling the predetermined dose 4 in the receptacle part 3. The heater and/or cooler unit 8 may be part of the device 1, so that the heater and/or cooler unit 8 can be activated for heating and/or cooling a single, individual predetermined dose 4. This way, the lyophilization process of each predetermined dose 4 can be controlled individually in a 1-to-1 basis. For example, the heater and/or cooler unit 8 can be an integral part of the mold, e.g. they can be formed together, e.g. the heater and/or cooler unit 8 may be embedded therein, e.g. they may be fixed together. For example, each heater and/or cooler unit may be functionally attached or fixed to each mold 2. For example, the device may comprise an electrical interface for receiving power and/or a control signal from the control unit for controlling the heating element 13 and/or the cooling element 12 in the freezing and/or (freeze-) drying process.

The heater and/or cooler unit 8 may comprise the heating element 13 and/or the cooling element 12 that are controllable by the control unit. However, embodiments of the present invention are not necessarily limited thereto, e.g. the heating element 13 and/or the cooling element 12 may also be implemented in a system in which the device 1 in accordance with the present invention can be used, or the heating element 13 and/or the cooling element 12 may comprise multiple heating elements 13 and/or cooling elements 12, e.g. one of which may be a cooling element 12 and/or a heating element 13 implemented by the heater and/or cooler unit 8 of the device 1.

In particular, the element may be used for both heating and for cooling. Thus, the heater and/or cooler unit may be a unit for heating and for cooling, e.g. including an element which can be driven for either providing heating and for providing cooling.

For example, the heater and/or cooler unit 8 may comprise a cooling device, such as a Peltier element. This cooling device may be used for freezing the product in the receptacle part 3, preceding the freeze-drying process. The control unit may receive temperature and/or heat flow information from the sensor 5 during this freezing of the product, and may send a control signal to control the cooling device taking the received information into account, e.g. for controlling a termination and/or a power modulation of the cooling action.

For example, the heater and/or cooler unit 8 may comprise a heating device, such as a Peltier element, an ohmic heater or another heater element known in the art. This heating device may be used for heating the product in the receptacle part 3, e.g. during the freeze-drying process. The control unit may receive temperature and/or heat flow information from the sensor 5 during this freeze-drying of the product, and may send a control signal to control the heating device taking the received information into account, e.g. for controlling a termination and/or a power modulation of the heating action. For example, the heating device may also be driven for providing cooling, thus obtaining a heating and cooling element. For example, the heating and cooling element may be a Peltier element.

The device may comprise a power receiver for receiving a power supply (e.g. by a wired connection, a wireless power transmission or a contact connection, e.g. a sliding electrical contact) and/or a battery for providing a power supply. The power supply may be connected to the heating and/or cooling element, an electric monitoring and/or controlling circuit for monitoring and/or controlling an electric current and/or voltage applied to the heater and/or cooler unit. The power supply may also be connected to the sensor 5 and/or the transmitter 6 for powering the sensor and/or transmitter.

The transmitter may also be adapted for transmitting data indicative of a monitored electric current and/or voltage supplied to the heater and/or cooler unit to the control unit. Additionally or alternatively, the device may comprise a receiver for receiving control information from the control unit for controlling the electric current and/or voltage supplied to the heater and/or cooler unit.

The heater and/or cooler unit may also comprise an absorber 9 for absorbing heat radiation, e.g. such that radiative heat provided by an external source of radiation can be efficiently converted to heat the product in the receptacle part 3. In other words, the heater and/or cooler unit do not necessarily comprise an active heater, but may comprise an element for passively assisting in a heating process provided by an external source.

For example, a vacuum chamber 14 of a system 10 in accordance with embodiments of the present invention, e.g. as described in further detail hereinbelow, may comprise a heating element 13 for heating the at least one predetermined dose 4 of the product when contained in the at least one receptacle part 3 of the mold 2, e.g. when the device 1 is in the vacuum chamber 14. This heating element 13 may be, for example, adapted for heating the predetermined dose 4 by convective heat transport. However, the heating element 13 may also be adapted for heating the predetermined dose 4 by radiative heat transport. For example, the heating element 13 may comprise an infrared and/or microwave radiation source. The absorber may thus be adapted for absorbing radiation emitted by the heating element 13.

The absorber may comprise a slab of absorbing material, or may comprise a coating onto a surface of the device, e.g. of the mold. The absorber is not necessarily limited to providing a good heat radiation absorption, but may also have other properties that provide a good conversion of radiative heat to heat of the product in the mold, e.g. a high emissivity (and hence a high absorptivity) and/or a predetermined thermal capacity (e.g. sufficiently low to allow a good response to controlled changes in the heat radiation impinging on the device and/or sufficiently high to ensure a stable heat transfer in case of unintended variations and/or fluctuations in the heat radiation impinging on the device).

Figure 10:
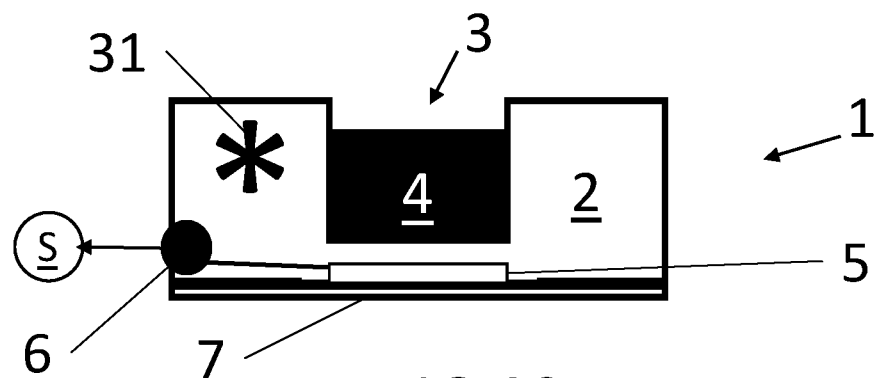
FIG. 10 shows a device, comprising an ultrasonic vibration generator, in accordance with embodiments of the present invention

Referring to FIG. 10, a device 1 in accordance with embodiments of the present invention may comprise an ultrasonic vibration generator 31, such as a piezo-electric crystal. The ultrasonic vibration generator 31 may be in contact with the mold or integrated in the mold 2. The ultrasonic vibration generator 31 may be adapted for controlling nucleation and/or crystal formation of the product by ultrasonification when freezing the predetermined dose 4, e.g. such as to advantageously increase the pore size and decrease the heterogeneity of the predetermined dose when freeze-dried. For example, the ultrasonic vibration generator 31, e.g. the piezo-electric crystal, may be activated when a supercooling temperature is reached. For example, the ultrasonic vibration generator 31 may be adapted for receiving a control signal from the control unit. The electrical interface for receiving power and/or a control signal from the control unit may be connected to the ultrasonic vibration generator 31 to provide the control signal from the control unit to the ultrasonic vibration generator.

A device 1 in accordance with embodiments of the present invention may comprise a plurality of receptacle parts 3 for containing a corresponding plurality of predetermined doses 4 of the product, e.g. units of substantially equal doses of the product. The device may also comprise a plurality of sensors 5 for measuring the temperature in and/or heat flux through the mold and/or for measuring the relative humidity and/or morphological properties of the product in locations corresponding to the plurality of receptacle parts, e.g. each sensor measuring the temperature and/or heat flux sufficiently near the corresponding receptacle part to be indicative of the thermal properties or response of the predetermined dose in that receptacle part, e.g. specifically for the corresponding receptacle part.

In a second aspect, the present invention relates to a system for freezing, drying and/or freeze-drying at least one predetermined dose 4 of a product.

Referring to FIG. 4, a system 10 in accordance with embodiments of the present invention comprises a device 1 in accordance with embodiments of the first aspect of the present invention.

In one embodiment, the system 10 comprises a cooling element 12 for freezing the at least one predetermined dose 4 of the product when contained in the at least one receptacle part 3 of the mold 2.

The cooling element 12 may comprise a tunnel freezer, e.g. a cryogenic tunnel (or, the system may comprise a tunnel freezer that comprises the cooling element 12). For example, the device 1 containing the predetermined dose(s) of the product in a liquid state may be transported through the freeze tunnel such as to freeze the predetermined dose(s). While a tunnel freezer may advantageously allow an inline processing, e.g. a continuous freezing of a sequence of the predetermined doses(s), embodiments of the present invention are not limited thereto. For example, the system may comprise a freezer cabinet or freezer room in which the device or a plurality of devices can be loaded for freezing the predetermined dose(s) contained in the mold(s).

The cooling element 12, e.g. a Peltier element, may be comprised in (or a part thereof may be comprised in) the heater and/or cooler unit 8 for heating and/or cooling the predetermined dose 4 in the receptacle part 3 of the device 1. For example, the product in the receptacle part(s) 3 may be frozen by the cooler unit 8 of the device, e.g. before being inserted into the vacuum chamber 14. For example, the product in the receptacle part(s) may be frozen while in the vacuum lock 16 by the cooler unit 8 of the device 1.

In accordance with embodiments of the present invention, the cooling element 12 may also be integrated in the vacuum lock 16, e.g. the vacuum lock may also act as a freezer.

In a further embodiment, the system 10 comprises a heating element 13 for heating the at least one predetermined dose 4 of the product when contained in the at least one receptacle part 3 of the mold 2.

In a specific embodiment, the system 10 comprises both a cooling element and a heating element.

The system 10 comprises a vacuum chamber 14 for exposing the at least one predetermined dose 4 to a low pressure environment, e.g. a vacuum environment, for example under an ambient pressure in the range of 5 Pa to 611 Pa, e.g. in the range of 10 Pa to 80 Pa, while heating the at least one predetermined dose 4 using the heating device 13 to desiccate the at least one predetermined dose, e.g. by sublimation of a carrier phase.

The system 10 may also comprise a vacuum or load lock 16 for inserting the at least one predetermined dose 4 into and/or removing the at least one predetermined dose 4 from the vacuum chamber 14, for example for inserting and/or removing the predetermined dose 4 while contained in the device 1, e.g. together with the device, or for inserting and/or removing the predetermined dose 4 separately in a frozen state, e.g. as illustrated in FIG. 4.

For example, the vacuum chamber 14 may comprise a plurality of shelves for holding the holding the predetermined dose(s) 4, e.g. directly or indirectly by supporting the system 10 containing the predetermined dose(s).

The system 10 further comprises a control unit 15 for receiving the at least one sensor signal from the transmitter of the device 1 and for controlling the heating element 13 and/or the cooling element 14, in which this controlling takes the at least sensor signal into account. Furthermore, the control unit 15 may also be adapted for controlling the loading system 17.

The control unit 15 is optional, if the device 30 includes as part of its mold a control unit 26, in accordance with some embodiments of the first aspect of the present invention.

The system in accordance with embodiments of the present invention may also comprise a blistering system 36 for packaging the predetermined dose(s), e.g. after being freeze-dried.

Referring to FIG. 4, the system 10 may comprise a loading system 17 for loading and unloading the predetermined doses 4 in a frozen state into and out of the vacuum chamber 14 via the vacuum lock 16. The predetermined doses 4 may be loaded in a frozen state, e.g. separate from the mold, or may be loaded together with the mold, e.g. while in the mold.

For example, in an exemplary embodiment, the frozen dose units 4 may be removed by the loading system 17 from a mold of a device 1 in accordance with embodiments of the first aspect of the present invention. The loading system 17 may deposit the frozen dose units 4 into suitable receptacles in the vacuum chamber 14. For example, these receptacles of the vacuum chamber 14 may be placed on shelves in the vacuum chamber or may be integrally formed in such shelves. The receptacles in the vacuum chamber may form part of a further device in accordance with embodiments of the first aspect of the present invention, e.g. comprising a sensor 5 for monitoring temperature and/or heat flow and/or relative humidity and/or morphological condition of the dried portion for each individual predetermined dose 4. Furthermore, a heater unit 8 may be integrated in this further device, e.g. for heating the predetermined dose 4 in the vacuum chamber in response to a control signal provided by a control unit 15.

The loading system 17 may also be adapted for removing the frozen and freeze-dried dose units from the receptacles in the vacuum chamber via the vacuum lock.

Alternatively, the loading system 17 may load the device 1 containing the frozen dose units 4 into the vacuum chamber 14 via the vacuum lock 16. For example, the device 1 may comprise a heater unit, e.g. for heating the predetermined dose 4 in the vacuum chamber in response to a control signal provided by a control unit 15. For example, advantageously, the device 1 may comprise a heater and cooler unit 8 for freezing the predetermined dose of the product, e.g. before being placed in the vacuum chamber, and for heating the predetermined dose of the product, e.g. while in the vacuum chamber.

The loading system 17 may also be adapted for removing the device 1 containing the frozen and freeze-dried dose units from the receptacles in the vacuum chamber via the vacuum lock.

Figure 5:
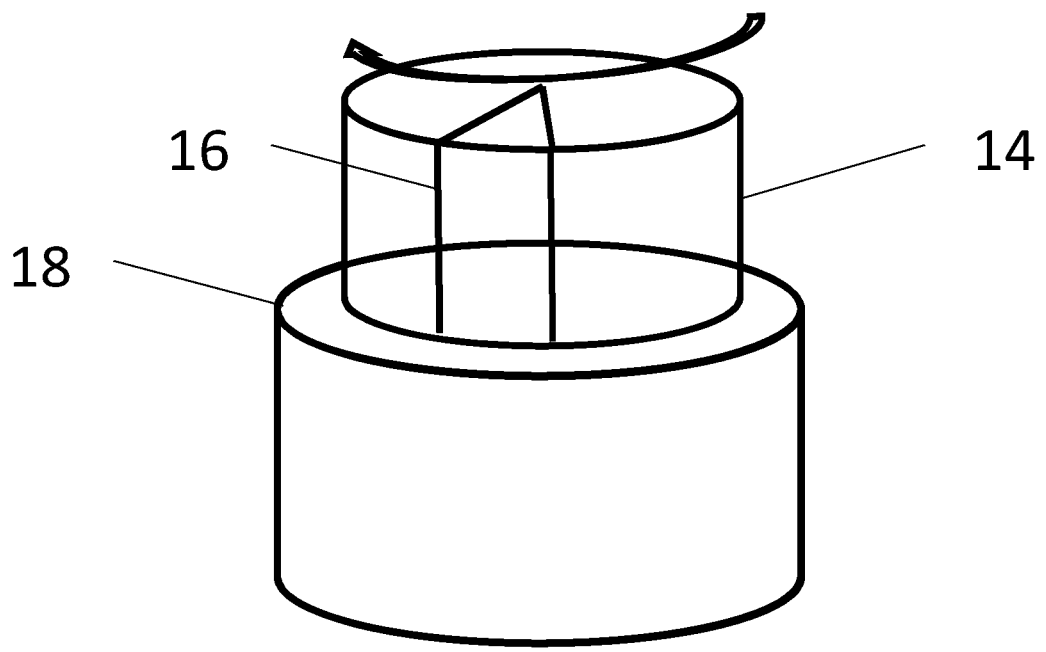
FIG. 5 shows a system comprising a rotatable cylindrical vacuum chamber in accordance with embodiments of the present invention.
Figure 6:
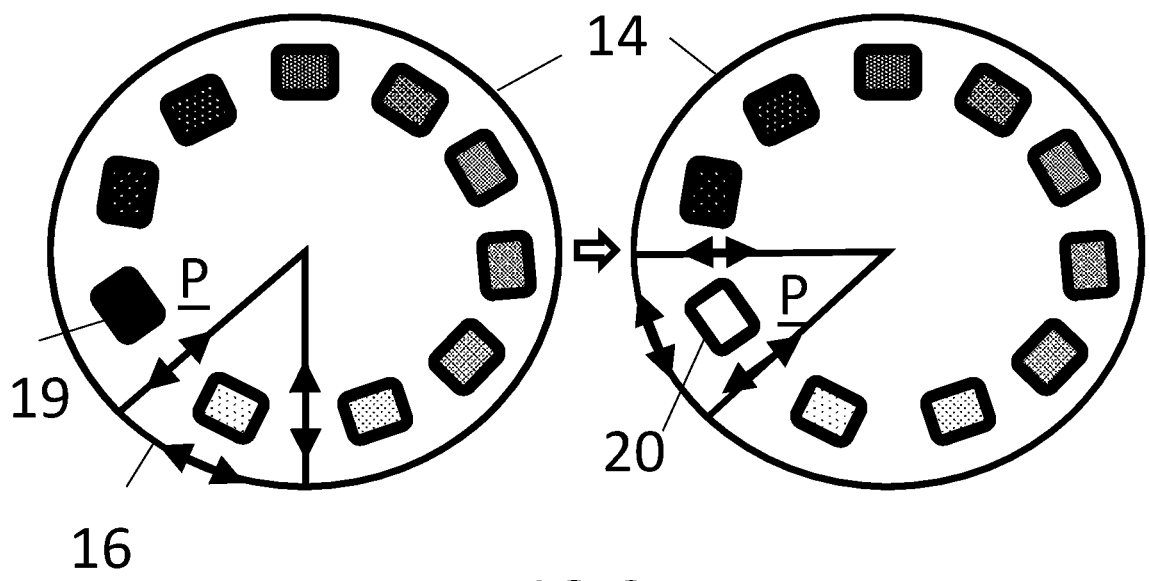
FIG. 6 shows an approach for freeze-drying a dose unit using a system comprising a rotatable cylindrical vacuum chamber in accordance with embodiments of the present invention.

In other exemplary embodiments, e.g. as illustrated in FIG. 5 and FIG. 6, the vacuum chamber 14 may be a cylindrical chamber and the vacuum lock 16 may form a segment of the cylinder. Alternatively, the vacuum lock may be connected, e.g. joined, to a segment of the cylinder, e.g. such as to allow access to that segment of the cylinder via the vacuum lock, e.g. via (part of) the vacuum lock in the cylinder wall in that segment.

For example, the vacuum chamber 14 may be rotatable over a stationary surface 18 (e.g. a stationary table). The system may comprise an actuator for rotating the vacuum chamber over the stationary surface 18. The control unit 15 may be adapted for controlling the actuator. For example, the at least one sensor signal received by the control unit may be taken into account when generating a control signal for the actuator.

The vacuum lock 16 may rotate, together with the vacuum chamber 14, such that a device 1 may be loaded in the vacuum chamber by placing the device 1 on the stationary surface 18 and rotating the vacuum lock away from the position where the device 1 was placed. Likewise, the device 1 may be unloaded again from the vacuum lock, e.g. after a full revolution of the rotating vacuum chamber.

Alternatively, the device 1 may be fixed to the stationary surface 18, e.g. a plurality of such devices 1 may be fixed on the stationary surface 18 (or integrated in the surface 18) at different angular positions. The predetermined dose(s) 4 may be loaded into the device(s) 1 via the vacuum lock and removed again from the device(s) after freeze-drying. For example, a gripper or similar transport mechanism may remove the freeze-dried product from the device via the vacuum lock, and a dispenser may fill the device again, via the vacuum lock, with a predetermined dose of the product to be frozen and freeze-dried.

For example, the predetermined dose 4 of the product may be frozen before insertion of the device 1 into the vacuum lock 16, and/or while the device 1 is in the vacuum lock. For example, the dose(s) may be frozen before entering the vacuum lock, e.g. in a tunnel freezer or similar freezer or by a heating and/or cooling element 8 integrated in the device 1. Alternatively, the dose(s) may be frozen while in the vacuum lock, e.g. by a cooling element 12 integrated in the vacuum lock and/or by a heating and/or cooling element 8 integrated in the device 1, e.g. a Peltier element.

The vacuum chamber may then rotate over the predetermined dose, e.g. over the device 1, until the vacuum lock reaches that device 1 again. During this exposure to the low pressure environment of the vacuum chamber, the frozen predetermined dose may be heated to remove a carrier fraction from the dose, e.g. to freeze-dry the predetermined dose 4. For example, this heating may be performed by a heating element 13 integrated in the vacuum chamber and/or by the heating and/or cooling element 8 integrated in the device 1, e.g. a ohmic heater and/or Peltier element.

The device 1 containing the freeze-dried predetermined dose unit in the receptacle part of its mold may then be removed from the vacuum lock, and another device 1 may be inserted at the same position on the stationary surface 18. This approach is schematically illustrated in FIG. 6, where after rotating the vacuum chamber, the vacuum lock 16 moves to a new position P. A device 1, inserted in a previous revolution of the vacuum chamber 14, has been exposed to the low pressure environment during this revolution, and the predetermined dose unit of the product has been fully dried during this exposure. The device containing the fully dried dose unit 19 can then be removed from the position P and replaced by a new device containing a new dose unit 20 to be freeze-dried. After removal from the device 1, e.g. in or outside the vacuum chamber, the fully dried dose unit 19 may be moved to a blistering system 36 for packaging the dose.

Figure 7:
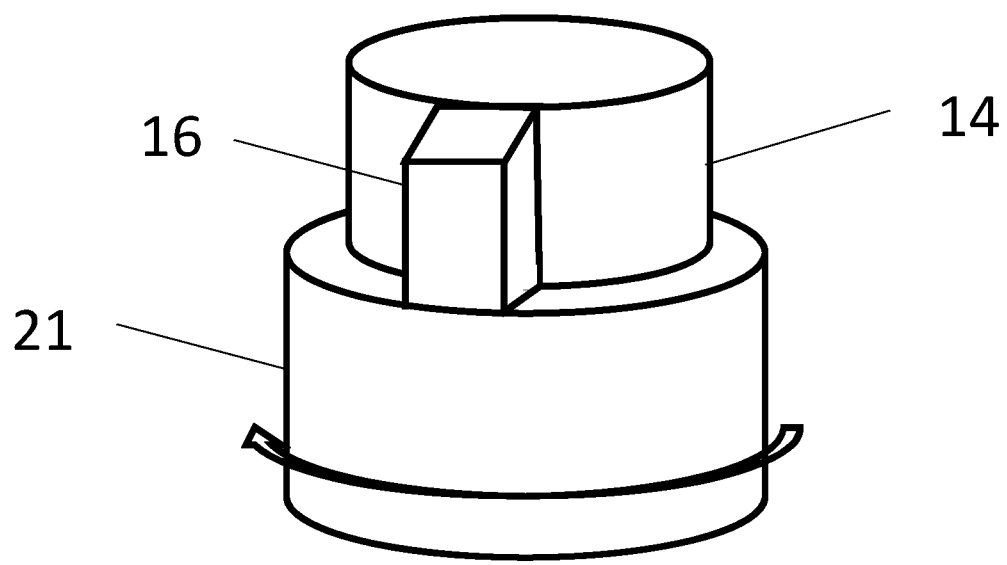
FIG. 7 illustrates another exemplary system comprising a stationary cylindrical vacuum chamber in accordance with embodiments of the present invention.
Figure 8:
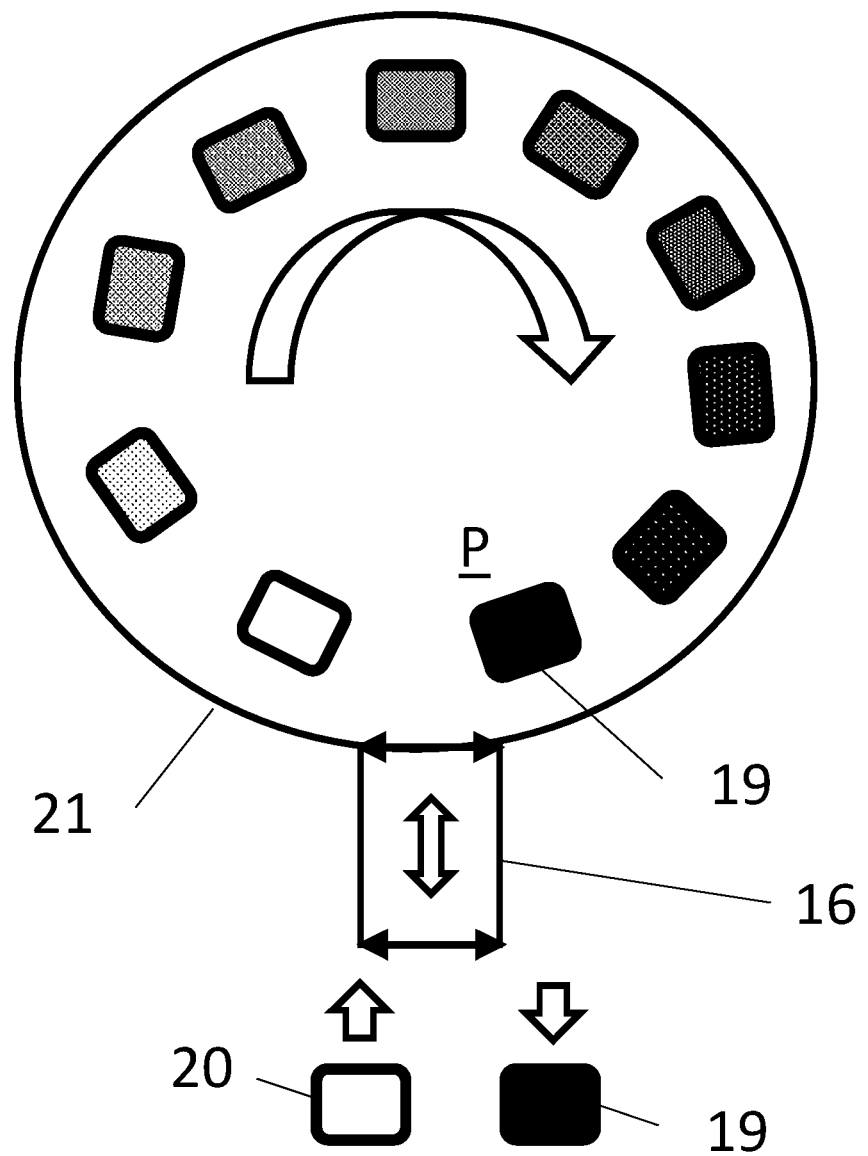
FIG. 8 shows an approach for freeze-drying a dose unit using a system comprising a stationary cylindrical vacuum chamber in accordance with embodiments of the present invention.

FIG. 7 and FIG. 8 illustrate another exemplary system in accordance with embodiments of the present invention. Again, the vacuum chamber 14 may be a cylindrical chamber and the vacuum lock 16 may form a segment of the cylinder. The vacuum lock may also be connected, e.g. joined, to a segment of the cylinder, e.g. as shown in FIG. 7.

For example, the vacuum chamber 14 may remain stationary, in operation of the system, while a rotatable surface 21 (e.g. a rotatable table) rotates in the vacuum chamber or underneath the vacuum chamber, e.g. forming a bottom surface of the vacuum chamber. The system may comprise an actuator for rotating the rotatable surface 21 in or under the vacuum chamber 14. The control unit 15 may be adapted for controlling the actuator. For example, the at least one sensor signal received by the control unit may be taken into account when generating a control signal for the actuator.

The vacuum lock 16 and the vacuum chamber 14 may remain stationary, in operation of the device, while a device 1 may be loaded in the vacuum chamber by placing the device 1 on the rotatable surface 21 via the vacuum lock. The rotatable surface 21 may then rotate to a next position, e.g. such as to allow access to another angular position on the rotatable surface via the vacuum lock. Likewise, the device 1 may be unloaded again via the vacuum lock, e.g. after a full revolution of the rotatable surface 21.

Alternatively, the device 1 may be fixed to the rotatable surface 21, e.g. a plurality of such devices 1 may be fixed on the rotatable surface 21 (or integrated in the surface 21) at different angular positions. The predetermined dose(s) 4 may be loaded into the device(s) 1 via the vacuum lock and removed again from the device(s) after freeze-drying.

For example, the predetermined dose 4 of the product may be frozen before insertion of the device 1 into the vacuum lock 16, and/or while the device 1 is in the vacuum lock. For example, the dose(s) may be frozen before entering the vacuum lock, e.g. in a tunnel freezer or similar freezer, and/or by a heating and/or cooling element 8 integrated in the device 1. Alternatively, the dose(s) may be frozen while in the vacuum lock, e.g. by a cooling element 12 integrated in the vacuum lock and/or by a heating and/or cooling element 8 integrated in the device 1, e.g. a Peltier element.

When the frozen predetermined dose 4 is brought into the vacuum chamber, the rotatable surface 21 may rotate through the vacuum chamber until the vacuum lock reaches the device 1 that contains the predetermined dose 4 again. During this exposure to the low pressure environment of the vacuum chamber, the frozen predetermined dose may be heated to remove a carrier fraction from the dose, e.g. to freeze-dry the predetermined dose 4. For example, this heating may be performed by a heating element 13 integrated in the vacuum chamber and/or by the heating and/or cooling element 8 integrated in the device 1, e.g. a ohmic heater and/or Peltier element.

The device 1 containing the freeze-dried predetermined dose unit in the receptacle part of its mold may then be removed via the vacuum lock, and another device 1 may be inserted at the same position on the stationary surface 18, or, alternatively, the freeze-dried predetermined dose unit may be removed from the receptacle part of the mold and replaced by another dose unit via the vacuum lock.

This approach is schematically illustrated in FIG. 8, where after rotating the rotatable surface 21, a new position P reaches the vacuum lock 16. A device 1, inserted in a previous revolution of the rotatable surface 21, has been exposed to the low pressure environment during this revolution, and the predetermined dose unit of the product has been fully dried during this exposure. The device containing the fully dried dose unit 19 can then be removed from the position P and replaced by a new device containing a new dose unit 20 to be freeze-dried. After removal from the device 1, e.g. in or outside the vacuum chamber, the fully dried dose unit 19 may be moved to a blistering system 36 for packaging the dose.

FIG. 9 shows another system in accordance with embodiments of the present invention. The system may comprise a conveyance mechanism 22, e.g. a conveyor belt, for transporting a plurality of the devices 1 in accordance with embodiments of the first aspect of the present invention. The conveyance mechanism may form a loop such as to transport the plurality of the devices 1 along a closed loop trajectory. For example, the conveyance mechanism 22 may be an endless conveyor belt. The plurality of devices 1 may be fixed on or integrated in the endless conveyor belt. For example, an endless mold may be formed by the plurality of devices.

The system comprises a cooling element 12 for freezing the at least one predetermined dose 4 of the product when contained in the at least one receptacle part 3 of the mold 2.

For example, the system may comprise at least one cooling shelf and/or the system may comprise a tunnel freezer 23, e.g. a cryogenic tunnel. The cooling shelf and/or the tunnel freezer may comprise the cooling element 12. The conveyance mechanism 22 may be adapted for transporting the plurality of devices through the tunnel freezer 23, e.g. such that each device 1, when containing the predetermined dose(s) of the product in a liquid state, is introduced in and transported through the tunnel freezer to freeze the predetermined dose(s). Thus, an inline processing, e.g. a continuous freezing of a sequence of the predetermined doses(s), is advantageously provided by embodiments of the present invention.

However, the cooling element 12, e.g. a Peltier element, may alternatively and/or additionally be comprised in (or a part thereof may be comprised in) the heater and/or cooler unit 8 for heating and/or cooling the predetermined dose 4 in the receptacle part 3 of the device 1. For example, the product in the receptacle part(s) 3 may be frozen by the cooler unit 8 of the device, e.g. before being transported into and through the vacuum chamber 14. For example, the product in the receptacle part(s) may be frozen while being transported by the conveyance mechanism outside and toward the vacuum chamber 14.

In accordance with embodiments of the present invention, the cooling element 12 may also be integrated in a vacuum lock 16, e.g. the vacuum lock may also act as a freezer. In such case, at least a heating element 13 is integrated in the device 1.

The conveyance mechanism may transport the plurality of devices 1 through the vacuum chamber 14. For example, the system may comprise a vacuum lock 16, e.g. a pair of vacuum locks, for allowing a device 1, while transported by the conveyance mechanism, to enter and/or exit the vacuum chamber 14.

When the frozen predetermined dose 4 is brought into the vacuum chamber, the conveyance mechanism 22 moves the predetermined dose 4 in one of the devices 1 through the vacuum chamber, until the device 1 reaches an exit vacuum lock. During this exposure to the low pressure environment of the vacuum chamber, the frozen predetermined dose may be heated to remove a carrier fraction from the dose, e.g. to freeze-dry the predetermined dose 4. For example, this heating may be performed by a heating element 13 integrated in the vacuum chamber, e.g. a ohmic heater and/or a source of heat radiation, e.g. an infrared and/or microwave radiation source (in which case at least a cooling element 12 is integrated in the device 1), and/or by the heating and/or cooling element of the heater and/or cooler unit 8 integrated in the device 1, e.g. a ohmic heater and/or Peltier element.

The device 1 containing the freeze-dried predetermined dose unit in the receptacle part of its mold may then be removed via the vacuum lock, e.g. by movement of the conveyance mechanism. Simultaneously, another device 1 containing a frozen predetermined dose unit to be freeze-dried may be inserted into the vacuum chamber by this movement of the conveyance mechanism.

The device 1 containing the fully dried dose unit may then move to a packaging system, such as e.g. a blistering system 36. For example, after removal from the device 1, the fully dried dose unit 19 may be packaged.

In some embodiments of the present invention, the mold includes inserts for easy release, such as the top inserts of FIG. 11 and FIG. 12. Additionally or alternatively, the inserts 24 may be part of the walls of the receptacle as explained earlier, such as the ring 24 of FIG. 9 and FIG. 18 or the blister of FIG. 19.

During a freezing process of the dose(s), the measurements obtained by the sensor 5 may be processed by the control unit 15, e.g. to actively adjust parameters of the freezing process, e.g. a power of a cooler and/or a duration of the freezing process, in particular for an individual unit dose. During a freeze-drying process of the dose(s) in the vacuum chamber, the measurements obtained by the sensor 5 may be processed by the control unit 15, e.g. to actively adjust parameters of the freeze-drying process, e.g. a power of a heater and/or a duration of the freezing process.

The control unit 15 may be adapted for, e.g. configured for and/or programmed for, performing a control step for controlling at least one parameter of a freezing and/or heating process, as described in detail further hereinbelow in relation to a method in accordance with embodiments of the present invention.

In a third aspect, the present invention relates to a method for freezing, drying or freeze-drying a product in predetermined dose units, e.g. to produce tablets such as orally disintegrating tablets.

Figure 13:
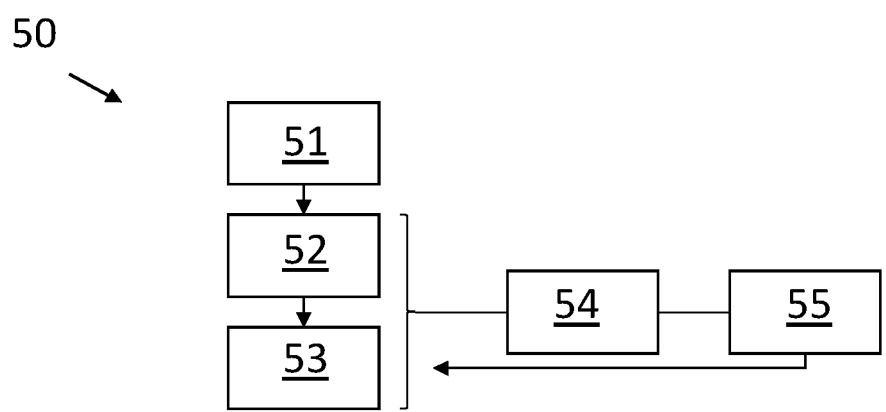
FIG. 13 shows a method in accordance with embodiments of the present invention.

Referring to FIG. 13, a method 50 in accordance with embodiments of the present invention is shown.

The method 50 comprises providing 51 at least one predetermined dose 4 of a product contained in a receptacle part 3 of a mold 2, e.g. containing the dose in direct contact with the receptacle part 3.

For example, providing the predetermined dose 4 may comprise providing a device 1, comprising the mold 2, in accordance with embodiments of the first aspect of the present invention.

For example, providing the predetermined dose 4 may comprise filling the receptacle part 3 of the mold 2 with a predetermined quantity of a liquid solution or suspension of the product.

The method 50 comprises freezing 52 the predetermined dose 4 of the product, e.g. the predetermined quantity of the liquid solution or suspension of the product, when contained in the receptacle part of the mold, e.g. using a cooling element 12.

The step of freezing 52 may comprise freezing the predetermined dose using a heater and/or cooler unit 8 that is integrated in or that is in direct contact with the mold.

The method comprises heating 53 the frozen predetermined dose 4 of the product in the at least one receptacle part 3 of the mold 2, e.g. using a heating element 13, while exposing the predetermined dose 4 to a low pressure environment, to desiccate the predetermined dose 4, e.g. by sublimation.

The step of heating 53 may comprise heating the predetermined dose using a heater and/or cooler unit 8 that is integrated in or that is in direct contact with the mold.

Heating or cooling (e.g. freezing) may comprise individually heating or cooling a single individual predetermined dose 4. Thus, a single heater and/or cooler unit 8 may be used to heat and/or cool a single predetermined dose 4.

The step of heating 53 may comprise a primary drying phase 56 and a secondary drying phase 57.

The method 50 comprises monitoring or measuring 54 a physical characteristic of the predetermined dose and/or a physical quantity affecting the predetermined dose, such as a temperature in and/or a heat flux through the mold and/or a relative humidity of the dry portion and/or a morphology of the product, during the step of freezing 52 and/or during the step of heating 53 using a sensor 5 that contacts the mold or that is integrated in the mold.

The method 50 may comprise transmitting the measured quantity and/or characteristic, e.g. the temperature and/or heat flux and/or relative humidity and/or the morphology, in the form of a sensor signal to a control unit for controlling a heating and/or cooling element.

The method 50 comprises if needed, controlling 55 at least one parameter of the freezing 52 and/or the heating 53, e.g. controlling the heating element 13 and/or the cooling element 14 by a control unit 15. This controlling 55 takes the measured temperature and/or heat flux, e.g. the sensor signal received by the control unit, into account.

Figure 14:
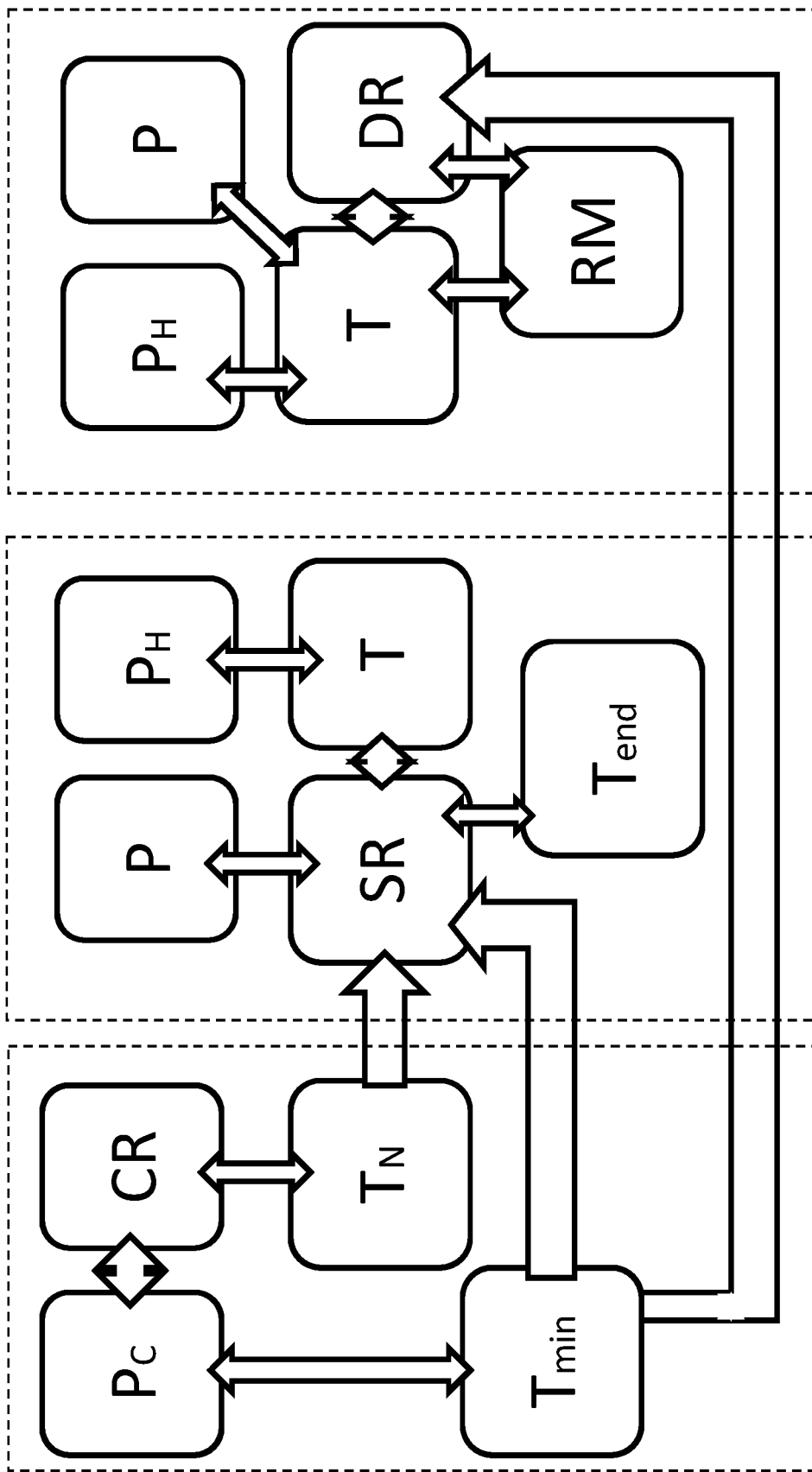
FIG. 14 shows an exemplary control diagram for a method in accordance with embodiments of the present invention.

For example, referring to exemplary control diagram in FIG. 14, controlling the at least one parameter of the freezing 52 process may comprise controlling a cooler power $P_C$. Controlling the cooler power may take a minimal product temperature $T_{min}$ into account. Furthermore, the cooler power may be determined from a target cooling rate CR, and/or the effective cooling rate CR may be determined from the cooler power. For example, controlling may comprise applying a heat transfer model, e.g. in accordance with Fourier's law of heat conduction, to relate the cooler power to a cooling rate.

Controlling the at least one parameter of the freezing process may also comprise determining a target cooling rate CR and/or a target cooler power taking a target nucleation temperature $T_N$ into account.

Controlling the at least one parameter of the freezing process may comprise applying an empirical model, e.g. an empirical model of the freezing process as described in Rambhatla et al, "Heat and mass transfer scale-up issues during freeze drying: II. Control and characterization of the degree of supercooling," in AAPS PharmSciTech 5(4), pp. 54-62.

Figure 15:
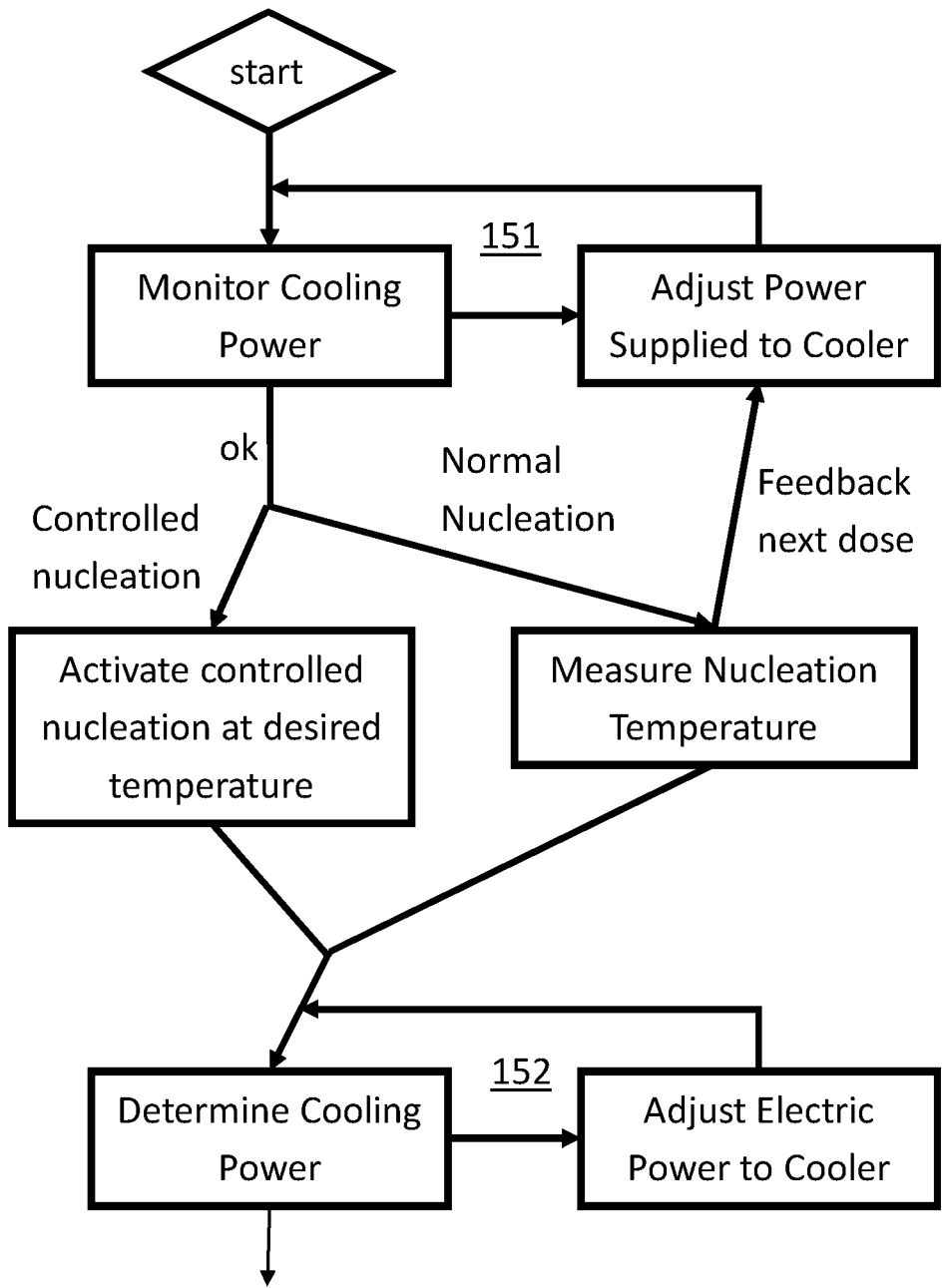
FIG. 15 shows an exemplary control diagram for a freezing step in a method in accordance with embodiments of the present invention.

Referring to FIG. 15, an exemplary flow diagram of the step of controlling the at least one parameter of the freezing process is shown.

This may comprise a loop 151 of monitoring a cooling power and adjusting a power supplied to a cooling element, e.g. an electric power supplied to a cooler.

When the monitored cooling power is within a predetermined target range, the nucleation temperature may be measured, which may be used as feedback for the freezing of a further dose, e.g. for adjusting a feedback parameter used in adjusting the power supplied to the cooling element.

Additionally or alternatively, the step of controlling may comprise activating a device for controlled nucleation at a predetermined temperature, e.g. at a desired temperature. For example, the method may comprise activating an ultrasonic vibration generator 31 positioned in contact with the mold or integrated in the mold for controlling the nucleation of the product by ultrasonification.

The control process may comprise a further loop 152 of monitoring the cooling power and adjusting the power supplied to the cooling element, e.g. an electric power supplied to the cooler, e.g. until a termination condition, such as a until the monitored cooling power is within a predetermined target range, is reached.

Controlling the at least one parameter of the heating process may comprise controlling the pressure P of the low pressure environment, e.g. of a vacuum chamber. Controlling the at least one parameter of the heating process may comprise controlling a heater power $P_H$.

For example, the step of controlling may comprise controlling the at least one parameter of the heating process during a primary drying phase 56.

For example, controlling the at least one parameter of the heating process during a primary drying phase 56 may comprise controlling a drying process in which the heating of the predetermined dose is (predominantly) achieved by radiative heat transfer. A model for infrared-mediated heat transfer during freeze-drying may be applied, for example as described in Van Bockstal et al, "Noncontact Infrared-Mediated Heat Transfer During Continuous Freeze-Drying of Unit Doses," in Journal of Pharmaceutical Sciences 2017, 106(1), pp. 71-82.

For example, controlling the at least one parameter of the heating process during a primary drying phase 56 may comprise controlling a drying process in which the heating of the predetermined dose is (predominantly) achieved by conductive heat transfer. A model for conductive heat transfer during freeze-drying may applied, e.g. as described in De Meyer et al, "Modelling the primary drying step for the determination of the optimal dynamic heating pad temperature in a continuous pharmaceutical freeze-drying process for unit doses," in International Journal of Pharmaceutics 2017, 532(1), pp. 185-193.

The step of controlling may comprise determining a sublimation rate SR, taking the pressure P, the product temperature T, the nucleation temperature $T_N$, the minimal temperature $T_{min}$ and/or a primary drying endpoint $T_{end}$ into account. For example, the pressure and/or the heater power may be controlled to obtain a target sublimation rate, e.g. taking the nucleation temperature $T_N$, the minimal temperature $T_{min}$ and/or a primary drying endpoint $T_{end}$ into account.

The step of controlling may comprise taking a measured product temperature T into account, and/or may comprise estimating the product temperature from a measured and/or controlled heating power $P_H$.

Figure 16:
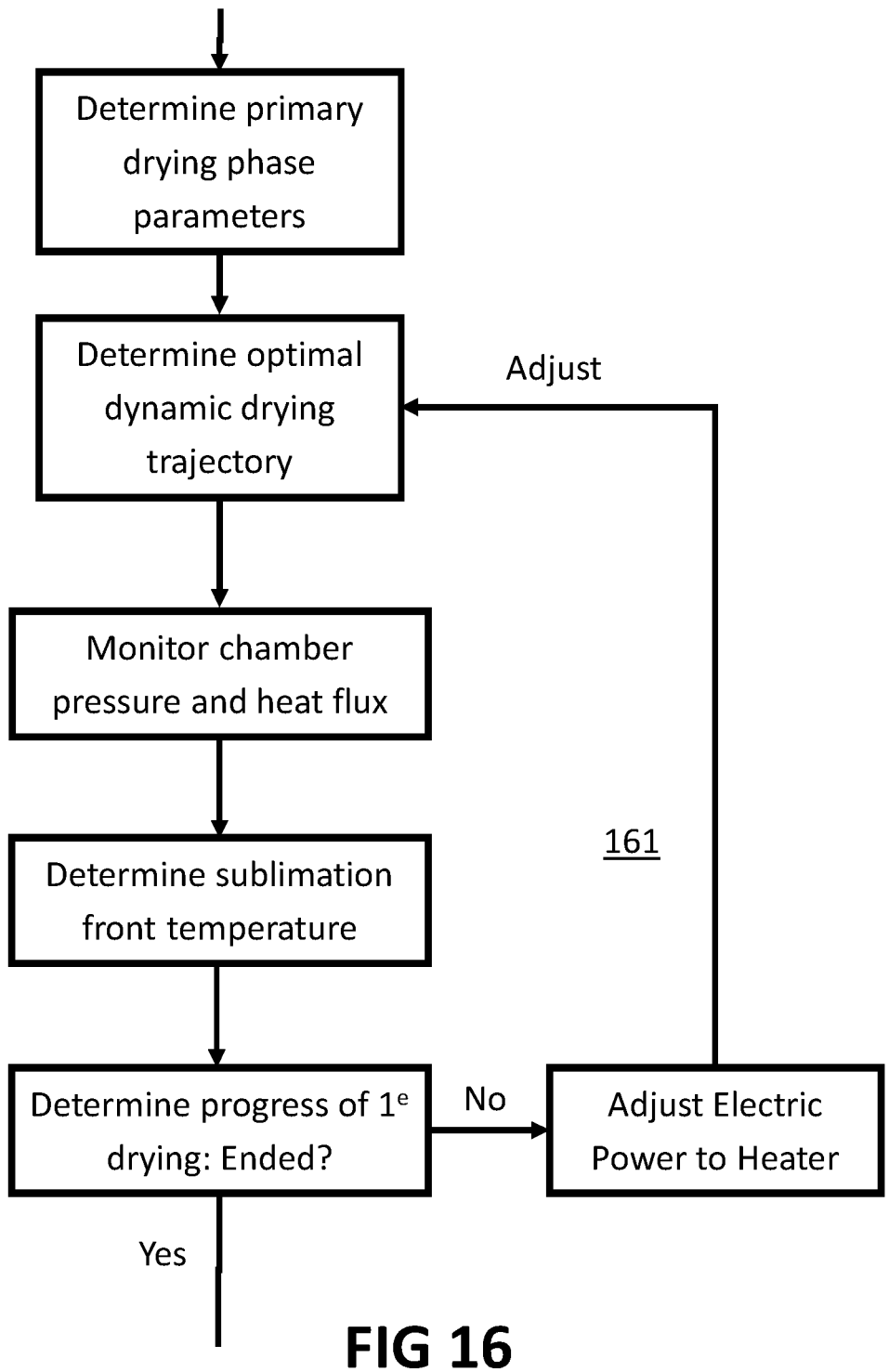
FIG. 16 shows an exemplary control diagram for a primary drying step in a method in accordance with embodiments of the present invention.

Referring to FIG. 16, an exemplary flow diagram of the step of controlling the at least one parameter of the primary drying process is shown. This may comprise determining the operational parameters for primary drying process, and, taking these operational parameters into account, determining an optimal dynamic drying trajectory.

A control loop 161 may adjust the supplied power to the heater until an endpoint of the first drying process is detected. During each iteration of the control loop, the dynamic drying trajectory may be updated and/or corrected, the pressure, heat flux and/or temperature may be monitored, and a sublimation front temperature may be estimated.

The step of controlling may comprise controlling the at least one parameter of the heating process during a secondary drying (annealing) phase 57. For example, the step of controlling may comprise applying a model as disclosed in Sahni et al, "Modeling the Secondary Drying Stage of Freeze Drying: Development and Validation of an Excel-Based Model," in Journal of Pharmaceutical Sciences 2017, 106(3), pp. 779-791.

The step of controlling may comprise determining a desorption rate DR, taking a residual moisture RM, the product temperature T and/or the minimal product temperature $T_{min}$ into account. For example, the pressure and/or the heater power may be controlled to obtain a target product temperature T, e.g. taking a residual moisture RM and a desorption rate DR into account.

Figure 17:
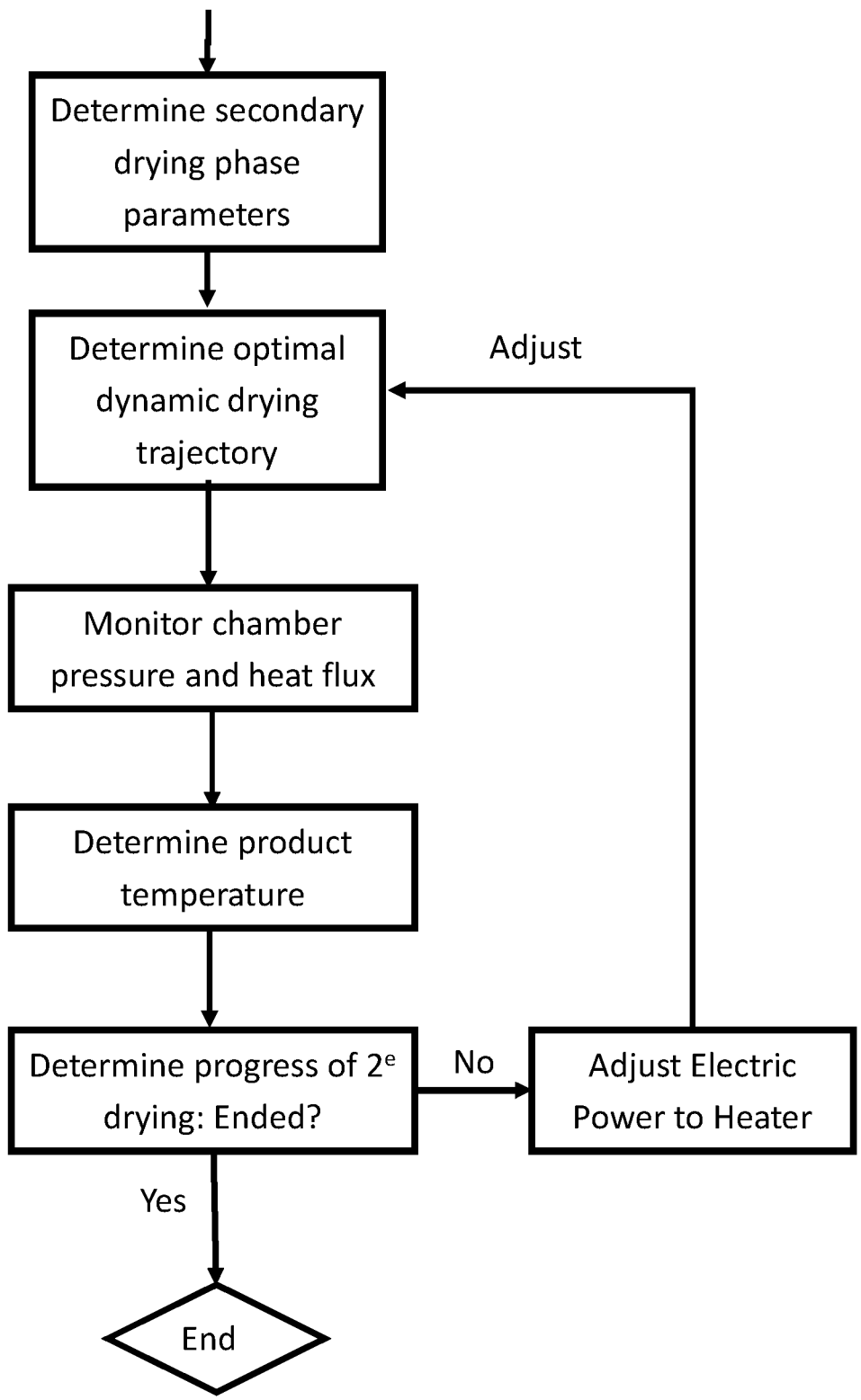
FIG. 17 shows an exemplary control diagram for a secondary drying step in a method in accordance with embodiments of the present invention.

Referring to FIG. 17, an exemplary flow diagram of the step of controlling the at least one parameter of the second-ary drying process is shown. This process step may be similar to the control approach illustrated in FIG. 16 for the primary drying process. For example, instead of estimating a sublimation front temperature, the process for controlling the secondary drying process may comprise estimating or measuring a product temperature and taking this information into account for determining whether a control loop 162 is terminated.

The heating and/or cooling of the predetermined individual dose can be done by the device, or by a combination of the device and the chamber where the mold including the product is introduced. For example, the device may provide cooling, while the chamber may provide heating.

In a further aspect, the present invention relates to a product obtained or obtainable by a method in accordance with embodiments of the present invention. The product may be an orally disintegrating tablet, a muco-adhesive tablet or a multilayer tablet. The product may comprise, or consist of, a particular dosage of a medicinal, biological and/or chemical substance, a food product, microorganisms (e.g. probiotics) and/or a substance for cosmetic or agricultural usage.

The invention claimed is:

1. A device for holding and monitoring a predetermined dose of a product during a drying, freezing and/or lyophilization process, the device comprising:
   a mold adapted for shaping the predetermined dose of the product, having a receptacle part for containing said predetermined dose of the product in direct contact with the receptacle part;
   at least one sensor, contacting the mold or integrated in the mold, for measuring a physical characteristic of said predetermined dose and/or a physical quantity affecting said predetermined dose during said process; and
   a transmitter for transmitting said measured physical characteristic and/or physical quantity in the form of a sensor signal to a control unit for controlling a heating and/or cooling element in said process;
   a heater and/or cooler unit for heating and/or cooling the predetermined dose when contained in the receptacle part;
   wherein said heater and/or cooler unit comprises the heating element and/or the cooling element that are controllable by the control unit;
   the heater and/or cooler unit being integrated in the mold and in communication with the control unit for controlling said element;
   for controlling heat transport to the individual predetermined dose.

2. The device of claim 1, wherein said mold is adapted for shaping the predetermined dose such that said predetermined dose of the product forms a tablet when said process has been carried out.

3. The device of claim 2, wherein said mold is adapted for shaping an orally disintegrating tablet, a muco-adhesive tablet or a multilayer tablet.

4. The device of claim 1, wherein the mold is adapted for providing easy removal of the individual predetermined dose.

5. The device of claim 1, wherein said heater and/or cooler unit comprises a Peltier element adapted for freezing and/or heating the predetermined dose in the receptacle part.

6. The device of claim 1, wherein said heater and/or cooler unit comprises an absorber for absorbing heat radiation.

7. The device of claim 1, wherein said device comprises an ultrasonic vibration generator positioned in contact with the mold or integrated in the mold,
wherein said ultrasonic vibration generator is adapted for controlling nucleation of the product by ultrasonification when freezing the predetermined dose.

8. The device of claim 1, comprising an insert element for inserting into the predetermined dose when contained in the receptacle part, said insert element comprising at least one elongate structure.

9. The device of claim 1, further comprising a control unit for controlling a heating and/or cooling element during said drying, freezing and/or lyophilization said process, wherein the transmitter and the control unit are integrated in the mold.

10. A system for freezing, drying and/or freeze-drying at least one predetermined dose of a product, the system comprising:
at least one device in accordance with claim 1, wherein the system comprises a control unit for receiving at least one sensor signal from the transmitter of said device and for controlling said heating element and/or said cooling element, in which said controlling takes said at least sensor signal into account; or a control unit for controlling a heating and/or cooling element during said drying, freezing and/or lyophilization said process, wherein the transmitter and the control unit are integrated in the mold;
a cooling element for freezing the at least one predetermined dose of the product when contained in the at least one receptacle part of the mold of the at least one device and/or a heating element for heating the at least one predetermined dose of the product when contained in the at least one receptacle part of the mold of the at least one device; and
a vacuum chamber for exposing the at least one predetermined dose to a low pressure environment while heating the at least one predetermined dose using said heating device to desiccate said at least one predetermined dose.

11. The system of claim 10, wherein said system comprises a vacuum lock for inserting the at least one predetermined dose into and/or removing the at least one predetermined dose from the vacuum chamber.

12. The system of claim 11, wherein said cooling element is integrated in the vacuum lock.

13. The system of claim 10, wherein said cooling element comprises a tunnel freezer, and wherein said system is adapted for transporting the at least one device containing the at least one predetermined dose in a liquid state through the tunnel freezer such as to freeze the at least one predetermined dose.

14. The system of claim 10, wherein said vacuum chamber is a cylindrical chamber, and
wherein said vacuum lock forms a segment of said cylindrical chamber or
wherein said vacuum lock is connected to a segment of the cylindrical chamber.

15. The system of claim 14, comprising a stationary surface or a rotatable surface,
wherein said vacuum chamber is adapted for rotating over said stationary surface or
wherein said rotatable surface is adapted for rotating in or underneath the vacuum chamber, and
wherein said system is adapted for loading the at least one device in the vacuum chamber by placing the at least one device on the stationary surface or on the rotatable surface via said vacuum lock.

16. The system of claim 10, comprising a conveyance mechanism for transporting a plurality of devices, said conveyance mechanism forming a loop such as to transport the plurality of devices along a closed loop trajectory.

17. A method for freeze-drying a product in a predetermined dose, the method comprising:
providing the predetermined dose contained in a receptacle part of a mold adapted for shaping the predetermined dose of the product,
freezing the predetermined dose of the product contained in the receptacle part of the mold,
heating the frozen predetermined dose of the product in the receptacle part of the mold while exposing the predetermined dose to a low pressure environment to desiccate the predetermined dose,
measuring a physical characteristic of the predetermined dose and/or a physical quantity affecting the predetermined dose during the step of freezing and/or during the step of heating using a sensor that contacts the mold or that is integrated in the mold, and
controlling at least one parameter of the freezing and/or the heating, wherein said controlling takes the measured physical characteristic and/or physical quantity into account,
wherein freezing and/or heating the predetermined dose of the product in the receptacle part of the mold comprised using a heater and/or cooler unit comprising a heating element and/or a cooling element being integrated in the mold, the heater and/or cooler unit being in communication with a control unit for controlling said heating element and/or a cooling element, for controlling heat transfer properties of the individual predetermined dose.

\* \* \* \* \*

UNITED STATES PATENT AND TRADEMARK OFFICE
CERTIFICATE OF CORRECTION

| | |
|---|---|
| PATENT NO. | : 11,828,535 B2 |
| APPLICATION NO. | : 17/252681 |
| DATED | : November 28, 2023 |
| INVENTOR(S) | : Thomas De Beer et al. |

It is certified that error appears in the above-identified patent and that said Letters Patent is hereby corrected as shown below:

On the Title Page

Under Item (73) Remove the line: "This patent is subject to a terminal disclaimer."
Item (45) Remove the "*"

Signed and Sealed this
Eighth Day of October, 2024

Katherine Kelly Vidal
*Director of the United States Patent and Trademark Office*